United States Patent
Paulsen et al.

(10) Patent No.: US 10,970,338 B2
(45) Date of Patent: Apr. 6, 2021

(54) PERFORMING QUERY-TIME ATTRIBUTION CHANNEL MODELING

(71) Applicant: Adobe Inc., San Jose, CA (US)

(72) Inventors: Trevor Paulsen, Lehi, UT (US); Ivan Andrus, Saratoga Springs, UT (US); Vladislav Turchenko, Cottonwood Heights, UT (US); Dirk DeHart, Provo, UT (US); David Wilcox, Lehi, UT (US); Brian Jarvis, Orem, UT (US)

(73) Assignee: ADOBE INC., San Jose, CA (US)

( * ) Notice: Subject to any disclaimer, the term of this patent is extended or adjusted under 35 U.S.C. 154(b) by 196 days.

(21) Appl. No.: 16/189,739

(22) Filed: Nov. 13, 2018

(65) Prior Publication Data

US 2020/0151281 A1    May 14, 2020

(51) Int. Cl.
*G06F 16/9038*    (2019.01)
*G06F 16/242*    (2019.01)

(52) U.S. Cl.
CPC ........ *G06F 16/9038* (2019.01); *G06F 16/244* (2019.01)

(58) Field of Classification Search
CPC .... G06F 16/9038; G06F 16/35; G06F 16/244; G06F 16/335; G06Q 10/067
See application file for complete search history.

(56) References Cited

U.S. PATENT DOCUMENTS

| | | | | |
|---|---|---|---|---|
| 7,212,625 B1 * | 5/2007 | McKenna | ........... | H04M 3/5191 379/266.01 |
| 10,169,778 B1 * | 1/2019 | Collin | ................ | G06Q 30/0246 |
| 10,332,156 B2 * | 6/2019 | Buchalter | ............ | G06Q 20/085 |
| 10,599,642 B1 * | 3/2020 | Hawes | ................ | G06F 9/44526 |
| 10,659,403 B2 * | 5/2020 | Smullen | ................ | H04L 51/046 |
| 2002/0116249 A1 | 8/2002 | Ellinger et al. | | |
| 2010/0217650 A1 * | 8/2010 | Hartnell | ............. | G06Q 30/0206 705/7.29 |
| 2011/0320715 A1 | 12/2011 | Ickman et al. | | |
| 2012/0226527 A1 * | 9/2012 | Carwile, Jr. | ......... | G06Q 10/107 705/7.38 |
| 2013/0035975 A1 | 2/2013 | Cavander et al. | | |

(Continued)

OTHER PUBLICATIONS

U.S. Appl. No. 16/166,806, dated Dec. 16, 2020, Office Action.
U.S. Appl. No. 16/189,812, dated Jan. 8, 2021, Office Action.

*Primary Examiner* — James Trujillo
*Assistant Examiner* — Michal Bogacki
(74) *Attorney, Agent, or Firm* — Keller Jolley Preece

(57) ABSTRACT

The present disclosure relates to performing attribution channel modeling in real time using touchpoint data that corresponds to a user-specified set of channels and is retrieved from a database using a user-specified attribution model. For example, in one or more embodiments, a system stores raw data in an attribution database that comprises an aggregator and a plurality of nodes. In particular, each node stores touchpoint data associated with a different user. Upon receiving a query, the system can, in real time, retrieve subsets of the touchpoint data that corresponds to a user-defined set of distribution channels in accordance with a user-specified attribution model. The system then combines the subsets of touchpoint data using the aggregator and generates the digital attribution report using the combined data.

20 Claims, 14 Drawing Sheets

(56) References Cited

U.S. PATENT DOCUMENTS

| | | |
|---|---|---|
| 2013/0301820 A1* | 11/2013 | Williams .............. G06Q 10/02 |
| | | 379/201.01 |
| 2014/0195339 A1 | 7/2014 | Paulsen et al. |
| 2014/0279057 A1 | 9/2014 | Shepherd et al. |
| 2015/0032725 A1 | 1/2015 | Barykin et al. |
| 2015/0046828 A1 | 2/2015 | Desai et al. |
| 2015/0161652 A1 | 6/2015 | Schnabl et al. |
| 2017/0017971 A1* | 1/2017 | Moreau ............. G06Q 30/0255 |
| 2017/0039577 A1 | 2/2017 | Gauthier et al. |
| 2017/0180284 A1* | 6/2017 | Smullen ................. H04L 63/18 |
| 2017/0337588 A1* | 11/2017 | Chittilappilly ......... G06N 7/005 |
| 2018/0096417 A1* | 4/2018 | Cook .................... H04L 67/306 |
| 2018/0308123 A1* | 10/2018 | Zhong ............... G06O 30/0273 |
| 2019/0130040 A1* | 5/2019 | Ma ....................... G06F 16/244 |

* cited by examiner

PERFORMING QUERY-TIME ATTRIBUTION CHANNEL MODELING

BACKGROUND

Advancements in software and hardware platforms have provided a variety of improvements in systems that enable digital content providers to manage campaigns for generating, providing, and distributing digital content across client devices. For example, attribution systems can analyze the effect of a campaign on the occurrence of a particular event (e.g., how the campaign influenced consumers to purchase a product). In particular, an attribution system can apply an attribution model to data representing consumer interactions with the digital content of a campaign (i.e., touchpoint data) and determine a percentage of event occurrences that can be attributed to different elements of the campaign, such as emails or banner advertisements distributed to the consumers or a website hosted or managed by the digital content provider.

Despite these advantages, conventional attribution systems have several technological shortcomings that result in inflexible and inefficient operation. For example, conventional attribution systems are often inflexible in that they rigidly collect data for predetermined attribution models and a predetermined set of marketing channels. In particular, many conventional systems preconfigure a database to store touchpoint data required by an attribution model for a set of marketing channels previously selected by an administrator. Indeed, conventional systems often pre-process the stored data before an administrator requests a report. Consequently, the conventional systems are often incapable of applying any other attribution models to the data or performing an attribution analysis for other marketing channels. To illustrate, a conventional system may configure a database to store consumers' first interaction with digital content (i.e., first touch) in order to model consumer interactions using a first touch attribution model as selected by an administrator. However, the system would be unable to apply any other attribution models if the user then desires to model the consumer interactions using a different attribution model (e.g., a last touch model). Similarly, a conventional system may configure a database to store consumers' interactions with digital content served via email and targeted advertisements. However, the system would likely be unable to apply an attribution model to any other marketing channels as such data would not have been pre-collected or pre-analyzed.

In addition to flexibility concerns, conventional attribution systems are also inefficient. For example, conventional systems typically struggle to efficiently adapt to changing administrator requests. In particular, because conventional systems are often unable to apply attribution models to touchpoint data unless a database has been preconfigured for those models, such systems often must reconfigure the database to accommodate any newly applicable models. Consequently, the conventional systems often require additional computing resources (e.g., processing time and power) in order to reconfigure the database accordingly.

These, along with additional problems and issues, exist with regard to conventional attribution systems.

SUMMARY

One or more embodiments described herein provide benefits and/or solve one or more of the foregoing or other problems in the art with systems, methods, and non-transitory computer readable storage media that perform attribution channel modeling in real time at the time of a request using a backend analytics system designed to allow for flexible, query time attribution modeling. For example, in one or more embodiments, a system stores raw, unprocessed analytics data in a database that comprises an aggregator and a plurality of nodes. In particular, each node stores the analytics data associated with a different user (e.g., consumer). Upon receiving a query, the system can process data from each node on the fly in order to generate digital attribution reports in accordance with query time user-specified distribution channels and/or attribution models. Specifically, the system retrieves subsets of data from the nodes that correspond to the user-specified distribution channels based on a user-specified attribution model user-specified distribution channels. The system then uses the aggregator to combine the subsets of data and generates a digital attribution report based on the combined data. In this manner, the disclosed systems can flexibly and efficiently apply user-specified attribution models to a set of user-specified channels at query time.

To illustrate, in one or more embodiments, the system stores touchpoint data in an attribution database that comprises an aggregator and a plurality of nodes where each node corresponds to a given user and stores touchpoint data associated with the user. The system can then receive a query to generate a digital attribution report for a user-specified set of distribution channels based on a user-specified attribution model. In response to receiving the query and in real time, the system can retrieve, using the nodes, subsets of touchpoint data corresponding to the user-specified set of distribution channels in accordance with the user-specified attribution model. Subsequently, the system can combine the subsets of touchpoint data using the aggregator, generate the digital attribution report based on the combined data, and provide the digital attribution report for display on a client device.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
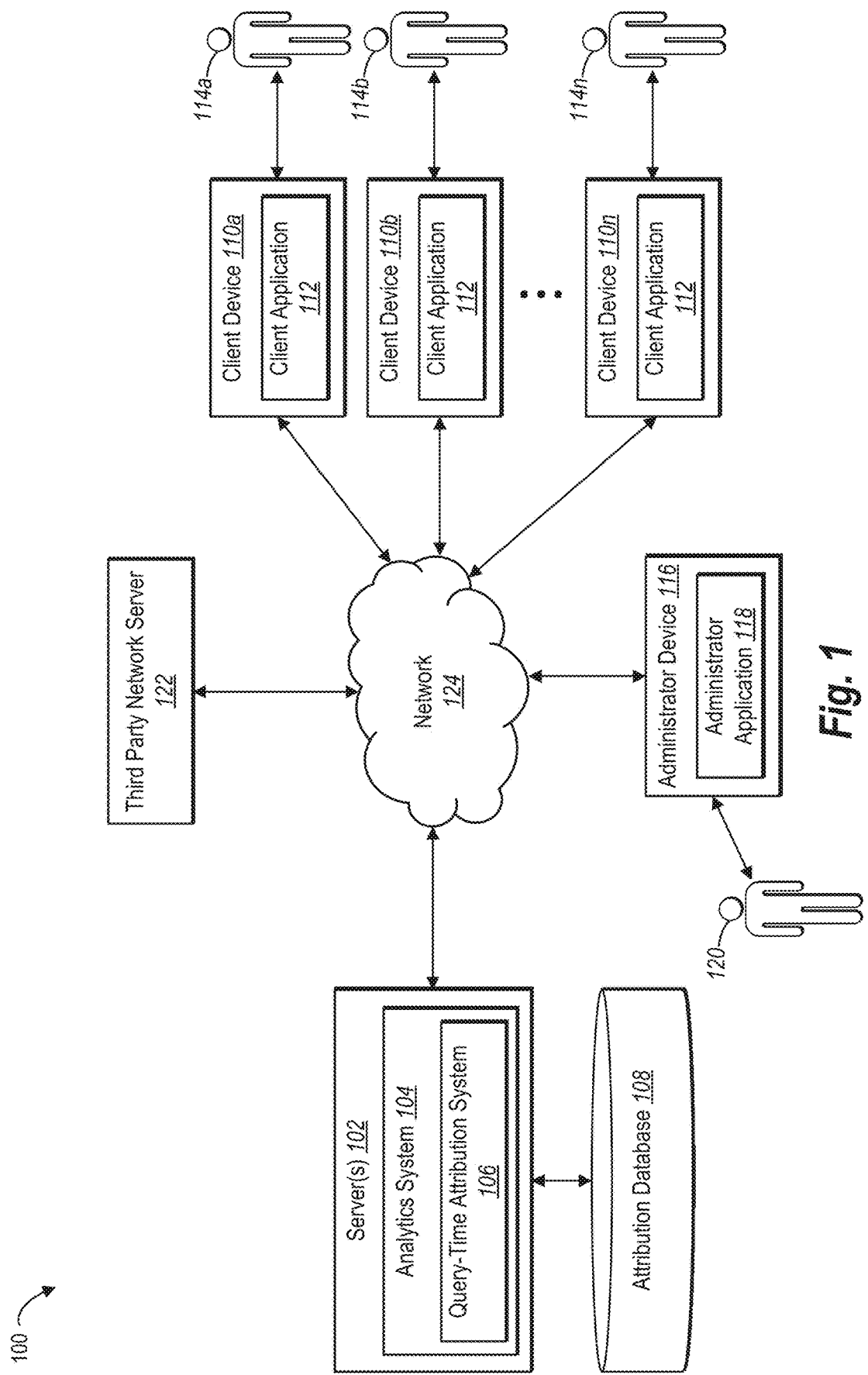
FIG. 1 illustrates an example environment in which a query-time attribution system can operate in accordance with one or more embodiments.

One or more embodiments described herein include a query-time attribution system that performs query-time attribution channel modeling using a database structured to allow for flexibility and speed. For instance, the query-time attribution system can store raw, unprocessed data in a plurality of nodes of an attribution database where each node corresponds to a different user (i.e., stores raw data associated with that user). The query-time attribution system can subsequently apply attribution logic to the stored data at query time to perform complex, on-demand attribution modeling. For example, upon receiving a query for a digital attribution report, the query-time attribution system can, in real time, retrieve subsets of data that correspond to a user-specified set of distribution channels in accordance with a user-specified attribution model. The query-time attribution system can then combine the subsets of data using an aggregator of the attribution database and generate the digital attribution report based on the combined data.

To provide an example, in one or more embodiments, the query-time attribution system stores touchpoint data in an attribution database that comprises an aggregator and a plurality of nodes. In particular, each node stores touchpoint data associated with a different user. The system can then receive a query that provides a user-specified set of distribution channels and a user-specified attribution model. In response to receiving the query, and in real time, the system can retrieve, from one or more of the nodes, a subset of the touchpoint data that corresponds to the user-specified set of distribution channels using the user-specified attribution model. The system can then combine the retrieved data using the aggregator, generate a digital attribution report based on the combined data, and provide the digital attribution report for display on a client device.

As just mentioned, in one or more embodiments, the query-time attribution system stores touchpoint data in an attribution database that comprises a plurality of nodes. In particular, each node can correspond to a separate user and the query-time attribution system can store all touchpoint data associated with that user in the corresponding node. In one or more embodiments, each instance of touchpoint data includes a timestamp and the query-time attribution system stores the touchpoint data in each node sequentially based on the time stamp. The query-time attribution system can further retrieve subsets of touchpoint data from the nodes in response to a query to generate a digital attribution report. In particular, each node includes a processing unit that, in response to a query, can filter out touchpoint data that does not correspond to a user-specified set of distribution channels and analyze the remaining data in accordance with a user-specified attribution model.

The attribution database further includes one or more aggregator. After retrieving the subsets of touchpoint data from the plurality of nodes, the query-time attribution system can use the aggregator to combine the subsets of touchpoint data. The query-time attribution system can utilize the combined subsets of touchpoint data to generate a digital attribution report.

In one or more embodiments, the attribution database further comprises a plurality of intermediate aggregators. In particular, each intermediate aggregator can correspond to a subset of nodes and can combine the subsets of touchpoint data retrieved from its corresponding subset of nodes to generate a set of aggregated touchpoint data. Subsequently, the query-time attribution system can use the aggregator (i.e., a master aggregator) to further combine the sets of aggregated touchpoint data from the plurality of intermediate nodes.

Additionally, as mentioned above, the query-time attribution system can generate digital attribution reports for sets of distribution channels specified by a user (i.e., an administrator) at query time. In particular, the query-time attribution system can provide, to a client device of an administrator, a user interface that provides selectable options indicating one or more distribution channels. The administrator can select one or more of the distribution channels to submit as part of a query. In response, the query-time attribution system can retrieve subsets of touchpoint data that corresponds to the user-specified set of distribution channels from the nodes of the attribution database. For example, if the query specified an email channel and a social network channel as the set of distribution channels, the query-time attribution system would retrieve subsets of the touchpoint data that corresponds to either the email channel or the social network channel. The query-time attribution system can then use the aggregator to combine the subsets of data corresponding to each user-specified channel (e.g., combine the data that corresponds to the email channel and separately combine the data that corresponds to the social network channel).

Similarly, the query-time attribution system can generate digital attribution reports using an attribution model specified by the administrator at query time. In particular, the administrator can use the user interface provided by the query-time attribution system to select an attribution model to submit as part of the query. In response, the query-time attribution system retrieves the subsets of touchpoint data corresponding to the user-specified set of distribution channels in accordance with the user-specified attribution model. For example, the query that includes an email channel and a social network channel as the set of distribution channels can also include a first touch attribution model as the user-specified attribution model. Consequently, the query-time attribution system retrieves subsets of data from the nodes that correspond to either the email channel or the social network channel and also qualify as a first touchpoint. By retrieving and combining the data, the query-time attribution system performs attribution modeling for the user-specified distribution channels using the user-specified attribution model.

The query-time attribution system provides several advantages over conventional systems. For example, the query-time attribution system improves the flexibility with which attribution models are applied. In particular, the query-time attribution system stores data without regard to any particular attribution model or distribution channel. Consequently, the query-time attribution system can apply any attribution model to any distribution channels identified at query time. For example, the query-time attribution system can store every touchpoint (i.e., interaction) experienced by a user leading up to a desired event in a node of the database. Having the raw data, allows the query-time attribution system at query time to perform on-demand attribution analyses for any distribution channel or attribution model. Therefore, touchpoint data is available for application of a first touch model or a last touch model, a more complex model (i.e., a J curve model), or even a custom model. Additionally, by allowing the user to specify the channels when submitting the query, the query-time attribution system can flexibly accommodate deeper analysis or fast and responsive evaluation.

Further, the query-time attribution system improves efficiency. In particular, by storing touchpoint data without regard to any particular attribution model and delaying processing of the data until a query has been received, the query-time attribution system avoids a need to preconfigure or reconfigure the attribution database to accommodate new queries. Consequently, the query-time attribution system improves the efficiency of implementing computer systems by requiring less processing power and time during operation.

In addition to the foregoing, the structure of the backend (e.g., database) of the query-time attribution system allows for increased speed. In particular, performing an attribution analysis for a website or native application can involve the processing of billions of pieces of data. Furthermore, conventional system often store such data in a distributed architecture and/or in non-relational databases. Due to the amount of data and such architectures, the amount of time to run a query time attribution report can be substantial and prohibitive due to the need of node cross-talk and other time consuming data retrieval processes. As such, and as previously discussed, the time required to perform query time attributing modeling using conventional system make query time attributing modeling unfeasible. In contrast, the structure of the backend (e.g., database) of the query-time attribution system allows for fast and efficient query-time attribution modeling. In particular, by storing touchpoint data for a single (or a limited number) of users in each node, the query-time attribution system eliminates the need for node cross-talk and ensures that each node can essentially instantaneously (e.g., in milliseconds) retrieve and forward to an aggregator the data applicable to an attribution query. The aggregator can then combine the applicable data so as to build an attribution report. Thus, despite having to processes large numbers of data, the structure of the query-time attribution system allows for fast and flexible query-time attribution modeling.

As illustrated by the foregoing discussion, the present disclosure utilizes a variety of terms describing features and benefits of the query-time attribution system. Additional detail is now provided regarding the meaning of these terms. For example, as used herein, a "dimension" refers to a set, category, or classification of values for organizing or attributing underlying data (e.g., a set of values for analyzing, grouping, or comparing event data). In some embodiments, a dimension refers to non-numeric characteristics (e.g., characteristics of one or more digital content campaigns) that correlate, relate, or classify events. Dimensions include, but are not limited to, distribution channels, products, product names, webpages, campaigns, ages, custom eVars, dates, monitor resolutions, genders, geographic locations, pages, or page names. Relatedly, a "dimension value" refers to a particular item, value, or component in a dimension. For example, a dimension value can be a particular distribution channel, product, product name, webpage, campaign, age, custom eVar, date, monitor resolution, gender, geographic location, monitor resolution, product, product name, page, or page name.

As a particular example of a dimension, a "distribution channel" can refer to a medium, channel, outlet, or method by which a user can access or receive information. For example, a distribution channel can include a medium by which a user purchases a product or observes a video related to a service. Distribution channels include, but are not necessarily limited to, email, referring domains, display, social media, organic search, paid search. Example distribution channels include, but are not necessarily limited to, email, referring domains (e.g., websites that include a link to a webpage of the digital content provider), display (e.g., banner advertisements), social media, organic search (e.g., where a search engine ranks a website of the digital content provider without the digital content provider paying for the listing), paid search, or direct access (e.g., directly accessing a web site).

As used herein, the term "touchpoint" refers to an interaction between two entities that can be tracked and stored. In particular, a touchpoint refers to an exposure of a user to digital content associated with a digital content provider (e.g., a business or company). For example, a touchpoint can refer to receiving an email, viewing an advertisement for the entity, visiting a webpage or social network page managed by the entity, or viewing a link to a webpage or social network page of the entity whether as a result of an organic search, a paid search, or a link provided by a third party (i.e., a referring domain). Touchpoints usually occur via distribution channels.

Further, as used herein, the term "touchpoint data" refers to digital data representing touchpoints. In particular, when a user is exposed to digital content associated with a digital content provider, the query-time attribution system can store, into an attribution database accessible or available to that digital content provider, touchpoint data corresponding to the particular touchpoint. For example, an instance of touchpoint data can include an indication of a touchpoint and a timestamp associated with the touchpoint.

Additionally, as used herein, the term "event" refers to a quantifiable action performed by a user or a quantifiable result of an action by a user. In some cases, an event includes a discrete quantifiable action (or result of an action) taken by a visitor on a network platform, such as in a software application or a on website. For example, an event can include, but is not limited to, an application download, an application use, a click, a click-through, a conversion, an order, a purchase, a webpage view, a web search, an instance of a quantity of time spent on a given webpage, a first time visit, a visitor from a search engine or a social networking site, a transaction resulting in a quantity of revenue, or a quantity of revenue over a certain amount.

Additionally, as used herein, the term "attribution" refers to a measure of causation, credit, contribution, responsibility, or influence (in whole or in part) between a factor or variable and a result. In particular, attribution can include an assignment of credit or influence to a dimension value for an event. For instance, attribution can refer to determining that digital content distributed through email are responsible for a particular percentage of overall purchases of a given product (i.e., the dimension value of email is wholly or partially responsible for particular purchase events).

Further, as used herein, the term "digital attribution report" refers to a digital description of an attribution. In particular, a digital attribution report provides a description of the credit or influence assigned to a dimension value for an event. For example, a digital attribution report can describe the attribution using a textual description, a visual description (e.g., charts and graphs), or an audio description.

Additionally, as used herein, the term "attribution model" as used herein refers to a computer-based algorithm or rule set that determines an attribution or attribution distribution. In particular, an attribution model includes a computer-implemented algorithm that determines a measure of causation, credit, contribution, influence, or responsibility between a factor (e.g., a dimension value) and a result (e.g., an event), where multiple factors may contribute to the result. In some embodiments, an attribution model employs machine learning or statistical models to determine weights (e.g., using a regression analysis). In other embodiments an attribution model is rule-based by using predetermined weights based on rules. The query-time attribution system can train an attribution model based on observations that incorporate a discrete-time survival model, which is a type of time-to-event model. In addition, the query-time attribution system can create a supervised learning model (e.g., via machine learning).

Attribution models include, for example, a first touch model, a last touch model, a linear model, a participation model, a same touch model, a U-shaped model, J curve model, an inverse J model, a time decay model, and a custom model. A first touch attribution model assigns all the credit of success to a first channel (or other dimension value) with which a user engages. A last touch model assigns all credit to the last channel (or other dimension value) with which a user engages. A linear model applies equal weight to all dimension values (e.g., distribution channels). A participation model assigns equal credit to every unique dimension value. A same touch model assigns all credit to the dimension value where a result (e.g., conversion) occurs. A U-shaped model assigns particular percentages of credit to dimension values of two key touchpoints—the first touch and the lead creation—as well as those values of any touchpoints in between the two. A J curve model assigns particular percentages of credit to the values of the first and last touchpoints (e.g., 20% to the first and 60% to the last) and spreads the remaining percentage across any dimension values of additional touchpoints. An inverse J model is the inverse of the J curve model where, for example, 60% of the credit is assigned to the dimension value of the first touchpoint and 20% is assigned to the last. A time decay model assigns credit according to the length of time between touchpoints or between a touchpoint and a result (e.g., a conversion), where dimension values of more recent touchpoints are weighted heavier than those of older touchpoints which may not have been as impactful on a given result. A custom model attributes credit according to user-defined parameters or settings. Indeed, the query-time attribution system can receive user input within a user interface to define a custom attribution model.

Additional detail regarding the query-time attribution system will now be provided with reference to the figures. For example, FIG. 1 illustrates a schematic diagram of an environment 100 in which a query-time attribution system 106 operates. As illustrated in FIG. 1, the environment 100 can include a server(s) 102, an attribution database 108, client devices 110a-110n associated with users 114a-114n, an administrator device 116 associated with an administrator 120, a third-party network server(s) 122, and a network 124.

Although the environment 100 of FIG. 1 is depicted as having a particular number of components, the environment 100 can have any number of additional or alternative components (e.g., any number of servers, client devices, administrator devices, databases, or other components in communication with the query-time attribution system 106 via the network 124). Similarly, although FIG. 1 illustrates a particular arrangement of the server(s) 102, the attribution database 108, the client devices 110a-110n, the users 114a-114n, the administrator device 116, the administrator 120, the third-party network server(s) 122, and the network 124, various additional arrangements are possible.

The server(s) 102, the attribution database 108 the client devices 110a-110n, the administrator device 116, the third-party network server(s) 122, and the network 124 may be communicatively coupled with each other either directly or indirectly (e.g., through the network 124, networks are discussed with greater detail below in relation to FIG. 12). Moreover, the server(s) 102, the client devices 110a-110n, the administrator device 116, and the third-party network server(s) 122 may include a computing device (including one or more computing devices as discussed in greater detail below in relation to FIG. 12).

As mentioned above, the environment 100 includes the server(s) 102. The server(s) 102 can generate, store, receive, and/or transmit data, including data regarding touchpoints, events, or digital attribution reports. For example, the server(s) 102 may receive touchpoint data from the client device 110a (e.g., via the third-party network server 122) and transmit a digital attribution report to the administrator device 116. In one or more embodiments, the server(s) 102 comprises a data server. The server(s) 102 can also comprise a communication server or a web-hosting server.

As shown in FIG. 1, the server(s) 102 can include an analytics system 104. In particular, the analytics system 104 can collect touchpoint data. For example, the analytics system 104 can collect touchpoint data associated with a particular user. The analytics system 104 can collect the touchpoint data in a variety of ways. For example, in one or more embodiments, the analytics system 104 causes the server(s) 102 and/or the third-party network server(s) 122 to track users' touchpoint data and report the tracked touchpoint data for storage on the attribution database 108. To illustrate, the third-party network server(s) 122 can include an email server that distributes emails from a digital content provider, tracks the emails to determine that they were properly received, and reports touchpoint data corresponding to each recipient that properly received the email to the analytics system 104. In one or more embodiments, the analytics system 104 receives user data directly from the client devices 110a-110n (e.g., browser cookies, cached memory), embedded computer code (e.g., tracking pixels), a user profile, or using various types of tracking techniques. Thus, the analytics system 104 collects or otherwise receives various types of data, including data regarding interactions of the users 116a-116n web sites, emails, native mobile device software applications, etc.

Additionally, the server(s) 102 can include the query-time attribution system 106. In particular, in one or more embodiments, the query-time attribution system 106 uses the server(s) 102 to store touchpoint data and generate digital attribution reports. For example, the query-time attribution system 106 can cause the server(s) 102 to receive a query and then generate a digital attribution report using stored touchpoint data in response to the query.

For example, in one or more embodiments, the server(s) 102 can store touchpoint data in the attribution database 108. The server(s) 102 can then receive a query to generate a digital attribution report for a user-specified set of distribution channels based on a user-specified attribution model. In response to the query, and in real time, the server(s) 102 can use the attribution database 108 to retrieve subsets of touchpoint data corresponding to the user-specified set of distribution channels using the user-specified attribution model and combine the subsets of touchpoint data. The server(s) 102 can then generate a digital attribution report based on the combined data and provide the report to a client device (e.g., the administrator device 116).

As illustrated by the previous example embodiments, the query-time attribution system 106 can be implemented in whole, or in part, by the individual elements of the environment 100. Although FIG. 1 illustrates the query-time attribution system 106 implemented with regards to the server(s) 102, it will be appreciated that components of the query-time attribution system 106 can be implemented in other of the components of the environment 100.

In one or more embodiments, the attribution database 108 stores all touchpoint data relevant to generating digital attribution reports. For example, the attribution database 108 can store touchpoint data, event data, and data characterizing each user (e.g., user ID, demographic information, or device description). The attribution database 108 will be discussed in more detail below with reference to FIGS. 8-9. Though FIG. 1 illustrates the attribution database 108 as a separate component to the analytics system 104, one or more embodiments include the attribution database 108 as a component of the server(s) 102 or the analytics system 104.

In one or more embodiments, the client devices 110a-110n include computer devices that allow users of the devices (e.g., the users 114a-114n) to be exposed to digital content associated with a digital content provider. For example, the client devices 110a-110n can include smartphones, tablets, desktop computers, laptop computers, or other electronic devices. The client devices 110a-110n can include one or more applications (e.g., the client application 112) that allows the users 114a-114n to be exposed to digital content associated with the digital content provider. For example, the client application 112 can include a software application installed on the client devices 110a-110n. Additionally, or alternatively, the client application 112 can include a software application hosted on the server(s) 102, which may be accessed by the client devices 110a-110n through another application, such as a web browser.

In one or more embodiments, the administrator device 116 includes a computer device that allows a user of the device (e.g., the administrator 120) to submit a query for and receive digital attribution reports. For example, the administrator device 116 can include a smartphone, tablet, desktop computer, laptop computer, or other electronic device. The administrator device 116 can include one or more applications (e.g., the administrator application 118) that allows the administrator 120 to submit a query for and receive digital attribution reports. For example, the administrator application 118 can include a software application installed on the administrator device 116. Additionally, or alternatively, the administrator application 118 can include a software application hosted on the server(s) 102, which may be accessed by the administrator device 116 through another application, such as a browser.

Figure 2:
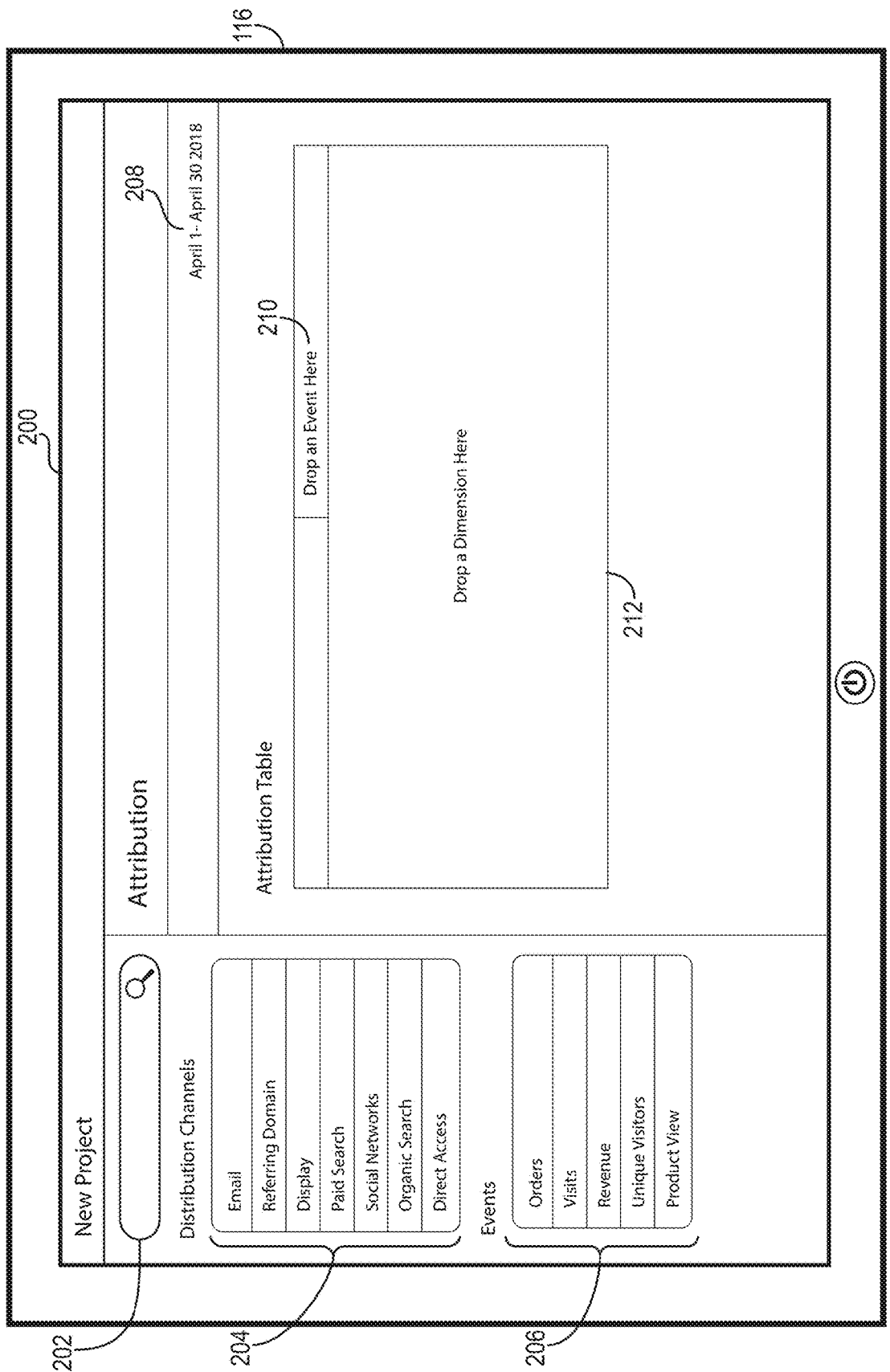
FIG. 2 illustrates a user interface provided by the query-time attribution system for submitting a query to generate a digital attribution report in accordance with one or more embodiments.

In one or more embodiments, the query-time attribution system 106 provides a user interface for receiving queries to generate digital attribution reports. FIG. 2 illustrates a user interface 200 that the query-time attribution system 106 provides for display on a client device (e.g., the administrator device 116) in accordance with one or more embodiments. In particular, the user interface 200 provides a plurality of options that an administrator can select in submitting a query for a digital attribution report. As illustrated in FIG. 2, the user interface 200 includes a search bar 202, distribution channel options 204, event options 206, date window 208, an event drop target 210, and a dimension drop target 212.

As mentioned above, the user interface 200 includes distribution channel options 204. In particular, the query-time attribution system 106 provides the distribution channel options 204 to enable an administrator to select one or more distribution channels to include in a query to generate a digital attribution report. In one or more embodiments, the query-time attribution system 106 provides distribution channels in addition to those shown. In some embodiments, the user interface 200 provides a selectable option whereby the administrator can view the additional distribution channels. In further embodiments, the query-time attribution system 106 can search for additional distribution channels based on input provided by the administrator in the search bar 202.

Additionally, the user interface 200 includes event options 206. In particular, the event options 206 enable the administrator to select an event to include in a query to generate a digital attribution report. In one or more embodiments, the query-time attribution system 106 provides events in addition to those shown in FIG. 2. In some embodiments, the user interface 200 provides a selectable option whereby the administrator can view the additional events. In further embodiments, the query-time attribution system 106 can search for additional events based on input provided by the administrator in the search bar 202.

As shown in FIG. 2, the user interface 200 further includes the date window 208. In particular, the date window 208 provides time limits on the touchpoint data used when applying attribution models. For example, in response to a user setting the date window 208 from Apr. 1-Apr. 30, 2018 as shown in FIG. 2, the query-time attribution system 106 can limit the application of attribution models to touchpoint data relevant to those dates (i.e., falling within those dates or corresponding to an event that falls within those dates). The query-time attribution system 106 can determine whether an instance of the stored touchpoint data falls within the established dates by comparing the dates included within the date window 208 with a timestamp of the instance of touchpoint data. In one or more embodiments, the administrator can modify the dates by selecting (e.g., clicking) the date window 208 and selecting a new date range. In some embodiments, the administrator can modify the date window 208 after an attribution model has been applied, and the query-time attribution system 106 can automatically reapply the attribution model to touchpoint data relevant to the newly selected dates in real time (i.e., submit a new query for the relevant touchpoint data).

As illustrated in FIG. 2, the user interface 200 further includes the event drop target 210 and the dimension drop target 212. In one or more embodiments, the user interface 200 further provides dimension options in addition to the distribution channel options 204 (as distribution channels are an example of dimensions). In some embodiments, the distribution channel options 204 are integrated with the dimension options and an administrator can access the distribution channel options 204 through the dimension options (e.g., by selecting "distribution channels" as presented within the dimension options). In further embodiments, the query-time attribution system 106 can search for any dimension based on input provided by the administrator in the search bar 202.

In one or more embodiments, the query-time attribution system 106 can include one or more distribution channels in an attribution query/report based on detecting a selection, by an administrator, of a distribution channel from the distribution channel options 204 (or from a list resulting from a search using the search bar 202) and optionally in response to detecting a dragging of the selected distribution channel to the dimension drop target 212. Similarly, in one or more embodiments, the query-time attribution system 106 can include one or more events in an attribution query/report based on detecting a selection, the administrator, of an event from the event options 206 (or from a list resulting from a search using the search bar 202) and optionally in response to detecting a dragging of the selected event to the event drop target 210. Upon detecting the section of one or more distribution channels and an event, the query-time attribution system 106 can perform a query and generate a digital attribution report. The query-time attribution system 106 can perform the query and generate the digital attribution report using a default attribution model or a user-selected attribution model as will be discussed in more detail below with reference to FIGS. 4-5C.

Figure 3:
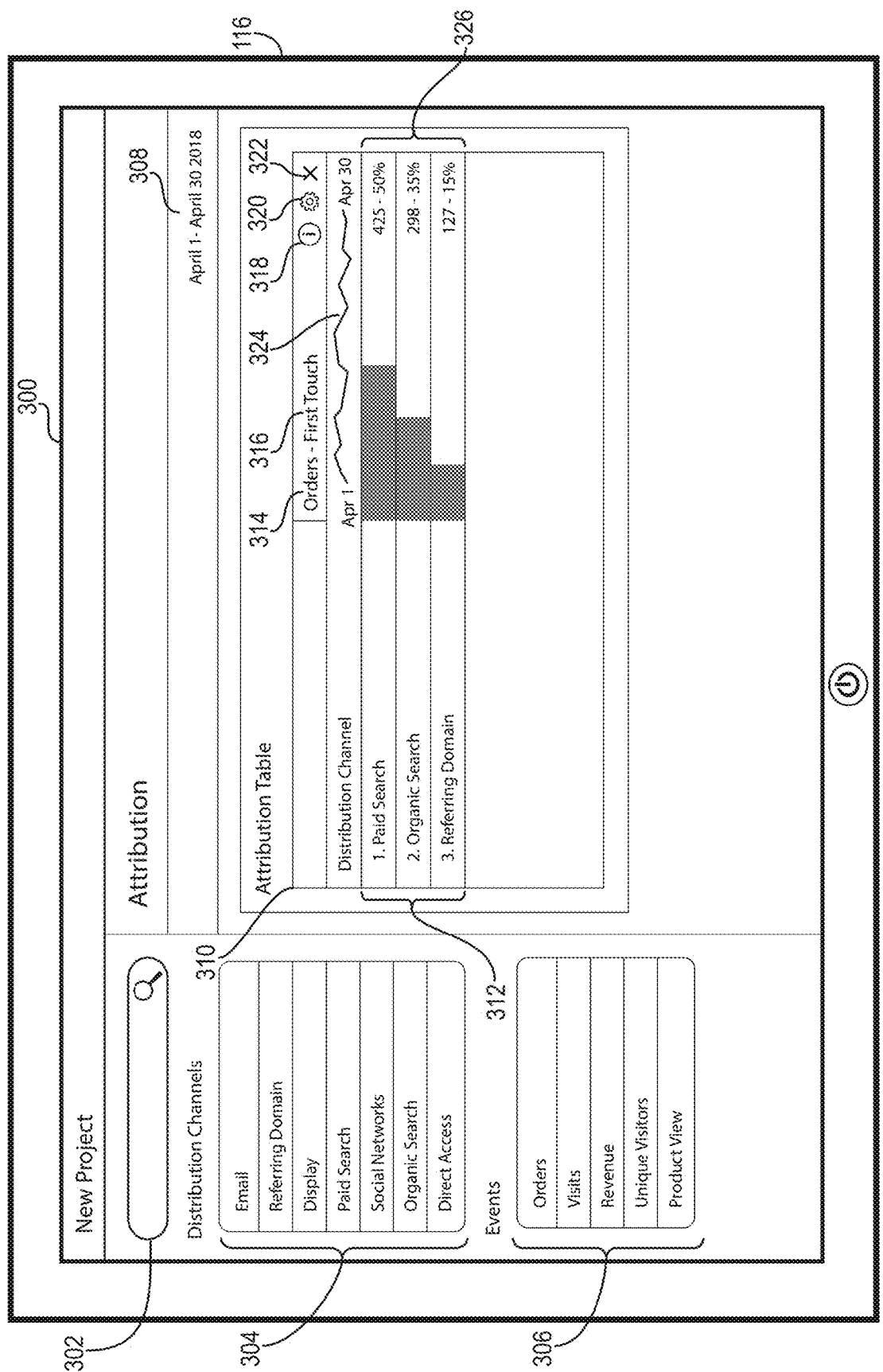
FIG. 3 illustrates a user interface displaying a digital attribution report in accordance with one or more embodiments.

FIG. 3 illustrates a user interface 300 provided by the query-time attribution system 106 after detecting parameters for an attribution query as described above in relation to FIG. 2. In particular, the user interface 300 is similar to the user interface 200 of FIG. 2, except that the user interface 300 provides the digital attribution report 310 in place of the event drop target 210 and the dimension drop target 212. As shown in FIG. 3, the digital attribution report 310 includes a user-specified set of distribution channels 312, a user-specified event 314, an attribution model indicator 316, an information option 318, a settings option 320, a deselect option 322, an event performance graph 324, and an attribution display 326.

The user-specified set of distribution channels 312 provides one or more distribution channels selected by an administrator from the distribution channel options 304 (or from a list resulting from a search using the search bar 302). As shown in FIG. 3, the user-specified set of distribution channels 312 include a "paid search" channel, an "organic search" channel, and a "referring domain" channel, indicating that the administrator intends to look specifically at how these distribution channels are to be credited in relation to a particular event.

Similarly, the user-specified event 314 provides an event selected by the administrator from the event options 306 (or from a list resulting from a search using the search bar 302). As shown in FIG. 3, the user-specified event 314 includes the "orders" event, indicating that the administrator intends to look specifically at how the user-specified set distribution channels 312 affected customer orders.

The query-time attribution system 106 indicates the attribution model applied to subsets of touchpoint data corresponding to the user-specified set of distribution channels 312 via the attribution model indicator 316. In one or more embodiments, the query-time attribution system 106 initially applies a default attribution model (e.g., a first touch model) to touchpoint data corresponding to the user-specified set of distribution channels 312. Some embodiments involve detecting a user-specified attribution model before generating the digital attribution report 310 and using the user-specified attribution model as the basis of the attribution report.

The query-time attribution system 106 uses the information option 318 to provide a textual, audio, and/or graphical description of one or more features of the digital attribution report 310. For example, the information option 318 can provide a description of the event indicated by the user-specified event 314 (i.e., provide a definition of the event). Additionally, or alternatively, the information option 318 can provide a description of the attribution model indicated by the attribution model indicator 316. The settings option 320 provides one or more selectable options, which when selected, cause the query-time attribution system 106 to modify the presentation of the digital attribution report 310 or the attribution model that is applied, as will be discussed in more detail below with regards to FIG. 4. In one or more embodiments, when the query-time attribution system 106 detects a selection of the deselect option 322, the query-time attribution system 106 deselects the event portrayed in the user-specified event 314. In some embodiments, in response to a detecting a selection of the deselect option 322, the query-time attribution system 106 deletes or hides the digital attribution report 310 entirely.

To provide a broad look at the occurrence of the user-specified event 314 throughout the time period defined by the date window 308, the query-time attribution system 106 provide an event performance graph 324. For example, as shown in FIG. 3, the event performance graph 324 provides a line graph representing how many orders have been received throughout the month of April (e.g., the date range provided in the date window). In one or more embodiments, the query-time attribution system 106 can modify the event performance graph 324 to provide a different graphical representation (e.g., a bar graph) of the occurrence of the user-specified event 314 in response to input by the administrator.

The attribution display 326, generated by the query-time attribution system 106, includes an event performance graph 324 that provides a graphical representation of the attribution resulting from application of the attribution model. As shown in FIG. 3, the attribution display 326 shows the credit assigned to each distribution channel from the user-specified set of distribution channels 312 for orders received in the month of April according to the applied attribution model. For example, the attribution display 326 shows that the first touch model credited half of the orders received in April to the paid search distribution channel. Additionally, or alternatively, the attribution display 326 can show the credit attributed to the user-specified set of distribution channels 312 using a different value, such as a dollar amount associated with the credited orders.

Figure 4:
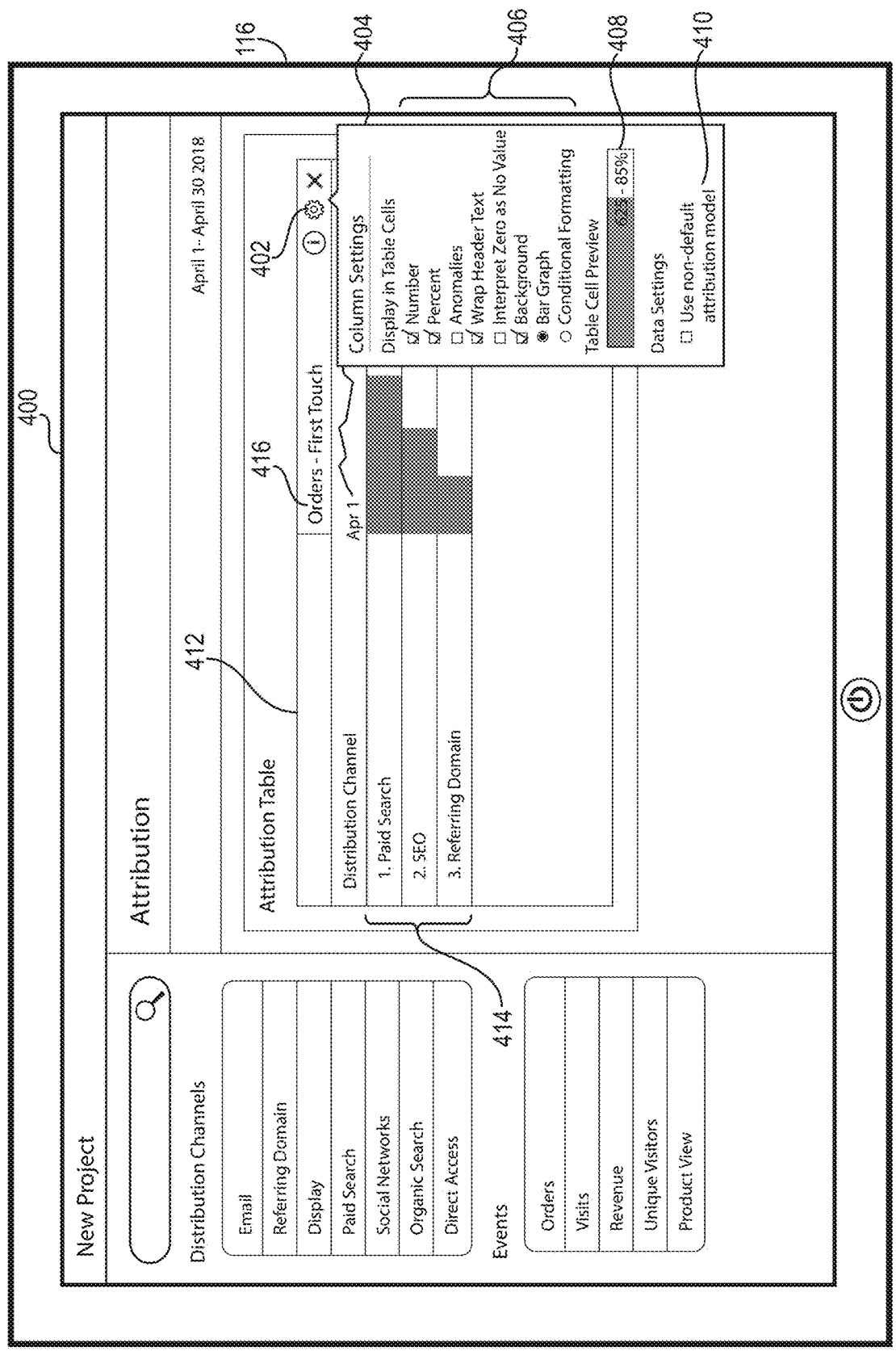
FIG. 4 illustrates a user interface displaying a settings window that provides options for editing a digital attribution report in accordance with one or more embodiments.

As mentioned above, in one or more embodiments, the query-time attribution system 106 performs generates an attribution report based on a user-specified attribution model specified as part of the query to generate a digital attribution report. FIG. 4 illustrates a user interface 400, provided by the query-time attribution system 106, including a settings window 404 providing various options to the administrator, including the option to select an attribution model. In one or more embodiments, the query-time attribution system 106 provides the settings window 404 in response to an administrator selection of the settings option 402.

As illustrated in FIG. 4, the settings window 404 provides a plurality of visualization options 406 by which an administrator can modify the visual presentation provided by the digital attribution report 412. For example, the administrator can select or deselect one or more options that cause the digital attribution report 412 to include or exclude particular data, respectively (e.g., "numbers" or "percent"). Additionally, the settings window 404 can include the table cell preview 408 that provides an example of the visualization that will be provided by the digital attribution report 412 based on the chosen visualization options.

Further, the settings window 404 includes the attribution model option 410. Upon selection of the attribution model option 410, the query time attribution system 106 enables the administrator to select a user-specified (e.g., non-default) attribution model. Where the administrator has previously submitted a user-specified attribution model, the attribution model option 410 will indicate (i.e., with a checkmark) that a non-default attribution model has already been applied. Consequently, the settings window 404 can further provide a selectable option (not shown) that enables the administrator to modify or change the applied attribution model. In one or more embodiments, in response to detecting a modification to the currently selected attribution model or submission of a new attribution model (e.g., by selecting to submit a non-default attribution model), the query-time attribution system 106 can recognize a new query for which to generate a digital attribution report. In particular, the new query will include the user-specified attribution model as well as the user-specified set of distribution channels 414 and the user-specified event 416.

Figure 5A:
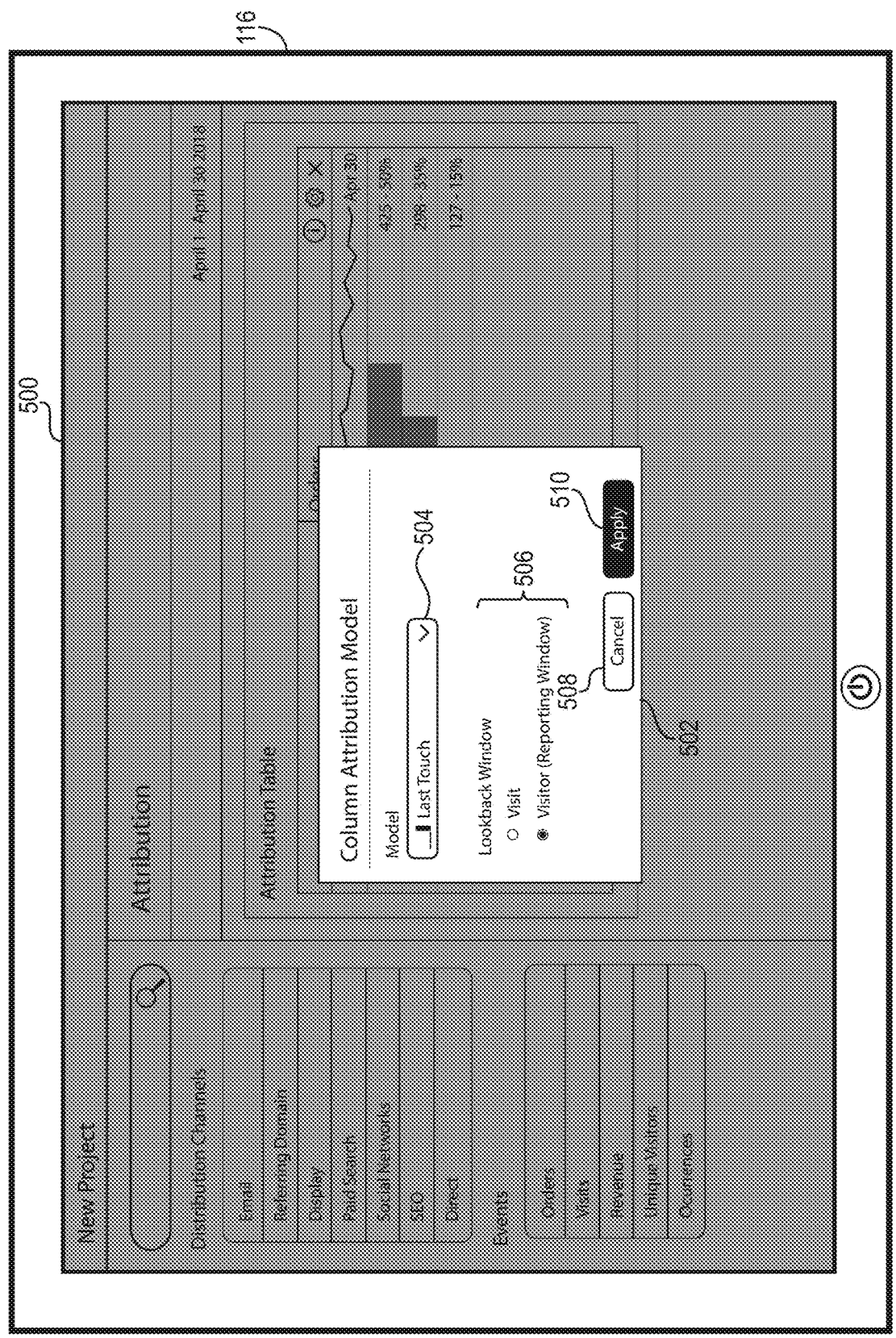
FIGS. 5A-5C illustrate a user interface displaying an attribution model selection window that provides options for selecting, changing, or modifying attribution models in accordance with one or more embodiments.
Figure 5B:
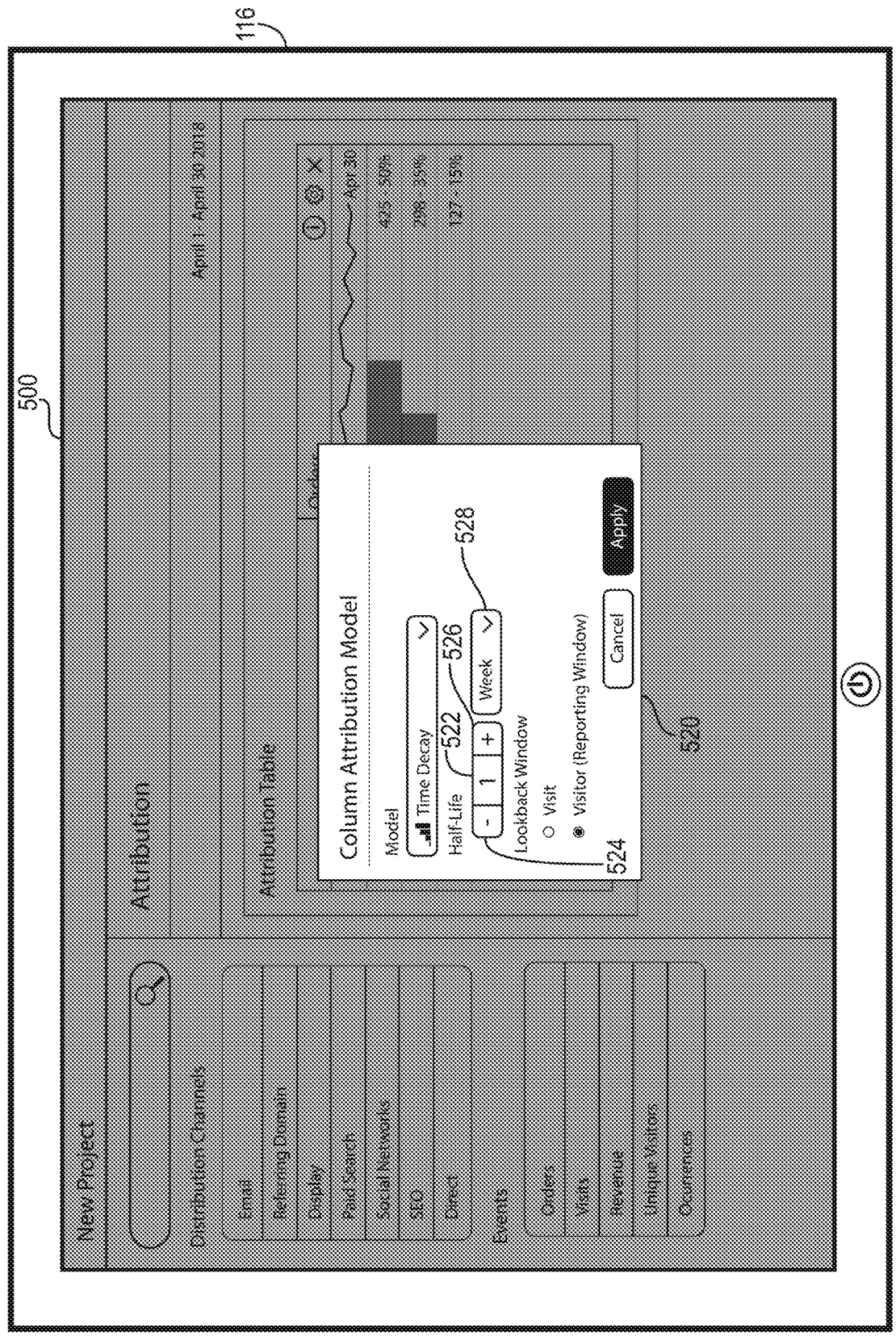
Figure 5C:
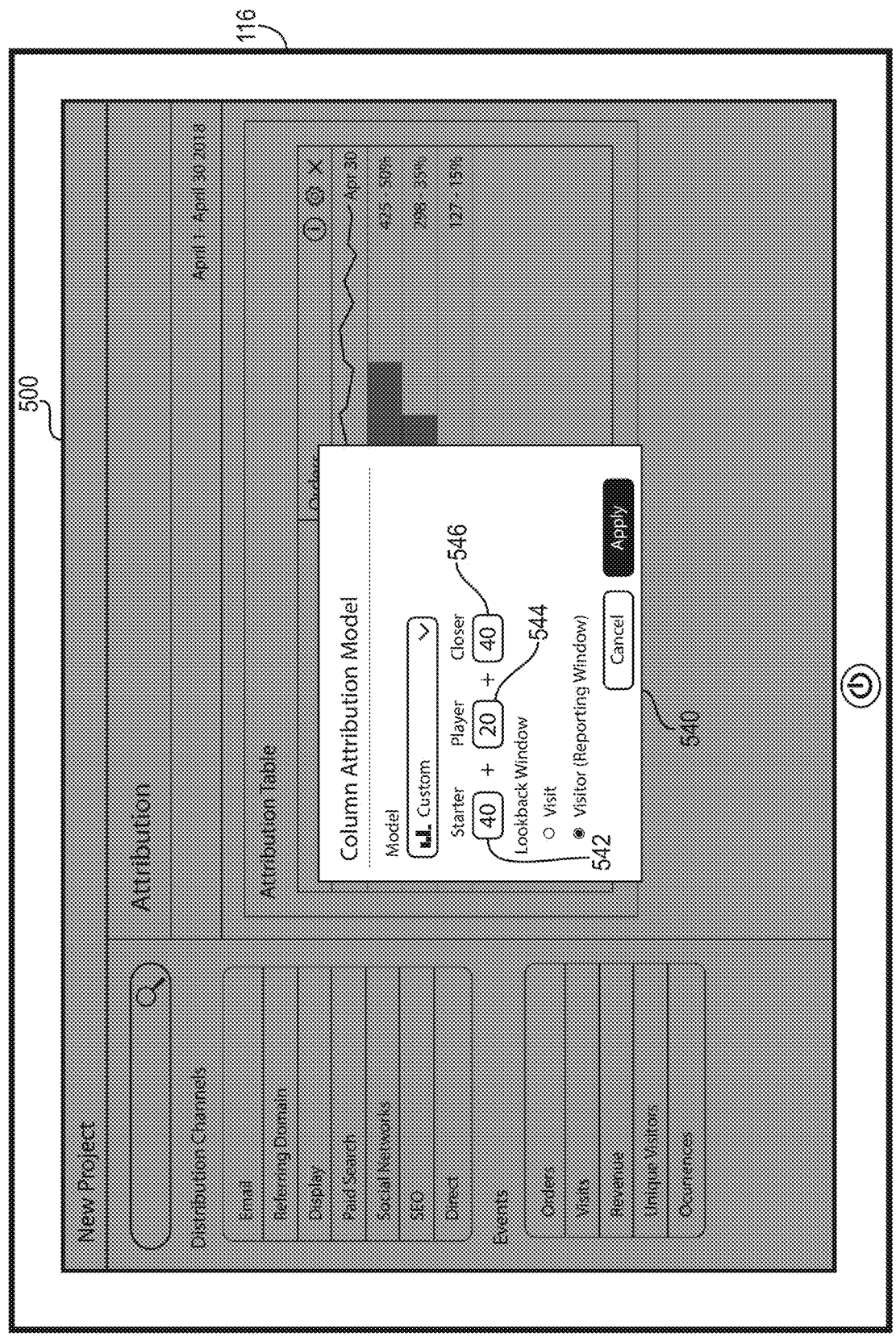

Indeed, upon receiving a selection of the attribution model option 410 or the selectable option enabling the user to modify or change the applied attribution model, the query-time attribution system 106 provides a window enabling the administrator to select a new attribution model or modify a currently applied attribution model. FIGS. 5A-5C illustrate the query-time attribution system 106 providing attribution model selection windows that enable an administrator to select or modify attribution models.

For example, FIG. 5A illustrates the query-time attribution system 106 providing a user interface 500 including an attribution model selection window 502. In particular, the attribution model selection window 502 includes an attribution model selection menu 504, lookback window options 506, a cancel button 508, and an accept button 510. The attribution model selection window 502 enables an administrator to select one of the available attribution models to apply to the user-specified set of distribution channels and the user-specified event. As illustrated in FIG. 5A, the attribution model selection menu 504 shows the attribution model that is currently applied (e.g., the default attribution model or the previously selected attribution model). In one or more embodiments, in response to detection of a selection of the attribution model selection menu 504, the query-time attribution system 106 provides a drop-down menu listing all of the available attribution models.

As shown in FIG. 5A, the lookback window options 506 enable a user to select either a visit lookback window or a visitor lookback window. When "visit lookback" is selected, the query-time attribution system 106 applies the selected attribution model to the stored touchpoint data on a per visit basis. When "visitor lookback" is selected, the query-time attribution system 106 applies the selected attribution model to the stored touchpoint data on a visitor basis.

The cancel button 508 allows the administrator to cancel an attribution model selection or modification, causing the query-time attribution system 106 to retain the previous attribution model settings. Selection of the accept button 510 submits a new query that includes the newly selected or modified attribution model. In response, the query-time attribution system 106 applies the newly selected or modified attribution model to the stored touchpoint data as will be discussed in more detail below with reference to FIGS. 8-9. The query-time attribution system 106 then generates a new digital attribution report—reflecting the results of the new query—and provides the new digital attribution report to the client device of the administrator.

FIG. 5B the query-time attribution system 106 providing an attribution model selection window 520. The attribution model selection window 520 is similar to the attribution model selection window 502 of FIG. 5A but provides additional user-selectable options that correspond to the time-decay attribution model. In particular, the attribution model selection window 520 provides the half-life numeral adjuster 522 and the half-life metric adjuster 528. An administrator can decrease or increase the numerical value of the half-life used by the half-life attribution model by selecting either the subtract button 524 or the add button 526, respectively. The administrator can additionally change the metric by which the half-life will be measured via the half-life metric adjuster 528. For example, the administrator can use the half-life metric adjuster 528 to define the half-life to be measured in years, months, weeks, days, hours, etc. In response to the selections made in the attribution model selection window 520, the query-time attribution system 106 can generate a new attribution report using an attribution model based on the detected selections.

FIG. 5C illustrates query-time attribution system 106 providing another attribution model selection window 540. As seen in FIG. 5C, the attribution model selection window 540 provides user-selectable options that correspond to a custom attribution model. In particular, the attribution model selection window 540 provides a first touch weight window 542, a mid-touch weight window 544, and a last touch weight window 546. By entering or modifying values in each of the weight windows, an administrator can customize the weights applied by the custom attribution model to each of the respective touches. In particular, the custom attribution model applies the value entered into the mid-touch weight window 544 to every applicable touchpoint that is neither a first touchpoint nor a last touchpoint. In one or more embodiments, the attribution model selection window 540 allows an administrator to enter any combination of values in the weight windows (e.g., any combination of values adding up to 100). In response to the selections made in the attribution model selection window 540, the query-time attribution system 106 can generate a new attribution report using an attribution model based on the detected selections.

Figure 6:
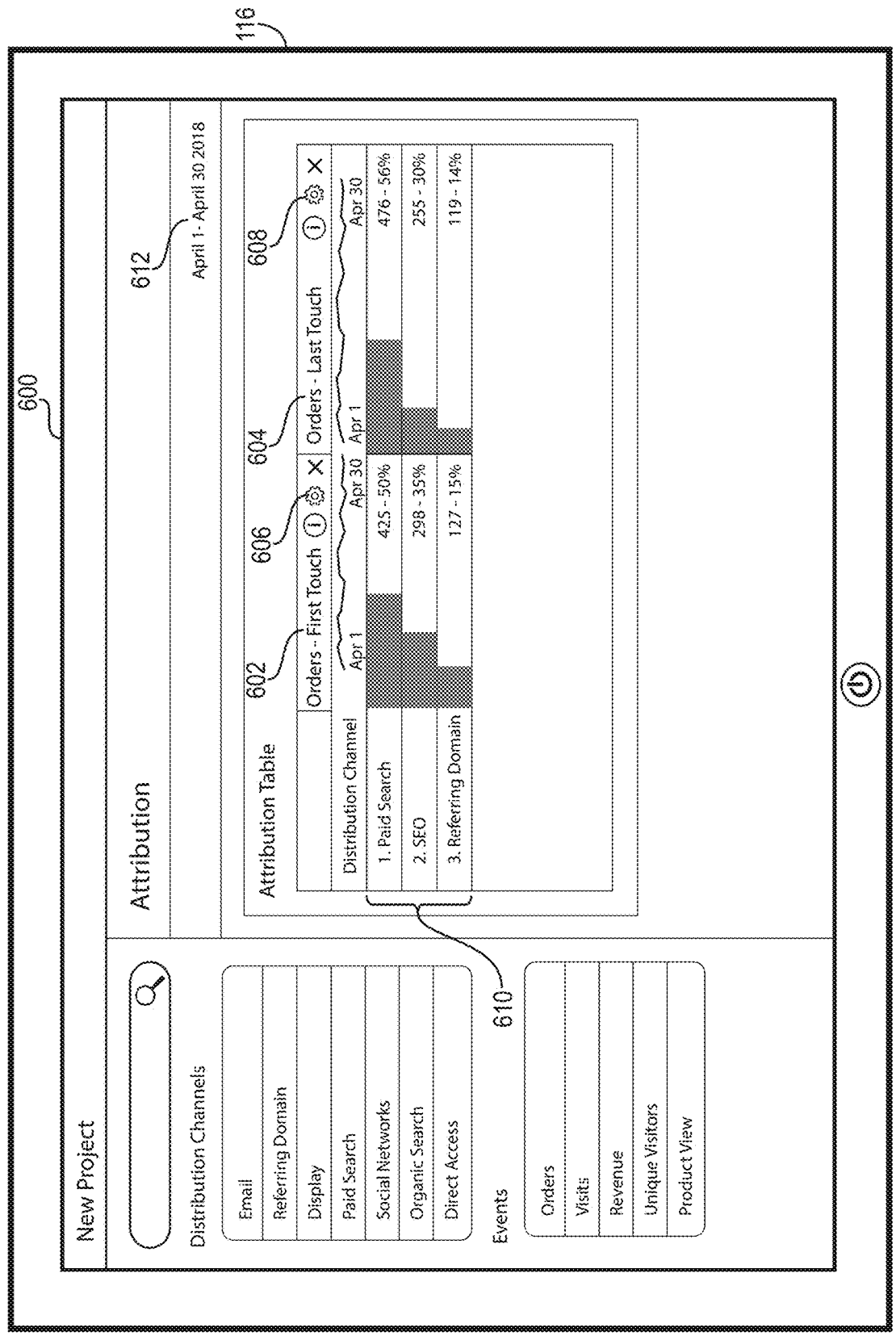
FIG. 6 illustrates a user interface displaying multiple digital attribution reports simultaneously in accordance with one or more embodiments.

In one or more embodiments, the query-time attribution system 106 can generate multiple digital attribution reports in response to multiple queries and provide the multiple digital attribution reports for simultaneous display on a client device (e.g., the administrator device 116). FIG. 6 illustrates a user interface 600 provided by the query-time attribution system 106 for displaying multiple digital attribution reports simultaneously. In particular, the user interface 600 includes a first digital attribution report 602 displaying results from application of a first attribution model and a second digital attribution report 604 displaying results from application of a second attribution model. In some embodiments, the user interface 600 can display any number of digital attribution reports simultaneously.

Thus, the query-time attribution system 106 introduces functionality that conventional attribution-modeling systems previously could not perform. In particular, the query-time attribution system 106 can allow for dynamic comparisons of events according to customized (or differing) attribution models. In particular, the query-time attribution system 106 can provide more complex and specific attributions than some of the conventional attribution models available to attribution-modeling systems. Additionally, or alternatively, in some embodiments, the attribution-visualization system generates attribution visualizations within the attribution user interface that previous systems could not generate (e.g., a single report generated on the fly comparing differing attribution models).

In one or more embodiments, the user interface 600 enables the administrator to submit the first query and the second query simultaneously. In some embodiments, the user interface 600 enables the administrator to submit a query for the second digital attribution report 604 after the query-time attribution system 106 has generated the first digital attribution report 602. For example, in one or more embodiments, the user interface 600 initially displays the first digital attribution report 602 generated by the query-time attribution system 106 after an administrator has submitted a first query. The administrator can select the first digital attribution report 602 and perform a dragging motion to the side (e.g., left or right) to submit a second query. In response, the query-time attribution system 106 can generate the second digital attribution report 604 and provide it for display on the user interface 600 simultaneously with the first digital attribution report 602. Subsequently, the administrator can select the first settings option 606 and/or the second settings option 608 to submit a new user-specified attribution model or attribution model modifications as discussed with reference to FIGS. 4-5C. In response, the query-time attribution system 106 can display the new results through the first digital attribution report 602 and/or the second digital attribution report 604, respectively.

As shown in FIG. 6, the first digital attribution report 602 and the second digital attribution report 604 each include many of the same components as the digital attribution report 310 of FIG. 3. However, as FIG. 6 shows, the first digital attribution report 602 and the second digital attribution report 604 each show the credit assigned to the same user-specified set of distribution channels (i.e., the user-specified set of distribution channels 610) as specified by the different attribution models. By simultaneously displaying the results of applying different attribution models to subsets of touchpoint data corresponding to the same user-specified set of distribution channels, the user interface 600 provides a comparison of the performance of distribution channels as shown by the different attribution models. For example, the first digital attribution report 602 shows that a first touch attribution model attributes half of the orders received in April to the paid search distribution channel. By contrast, the second digital attribution report 604 shows that a last touch attribution model attributes additional orders to the paid search distribution channel. In one or more embodiments, the user interface 600 enables the administrator to define a different user-specified set of distribution channels for each of the digital attribution reports 602, 604.

Similarly, as shown in FIG. 6, the first digital attribution report 602 and the second digital attribution report 604 each show the results of touchpoint data relevant to the same time window (i.e., the time window 612). In one or more embodiments, however, the user interface 600 enables the administrator to define a different time window for each of the digital attribution reports 602, 604.

Figure 7:
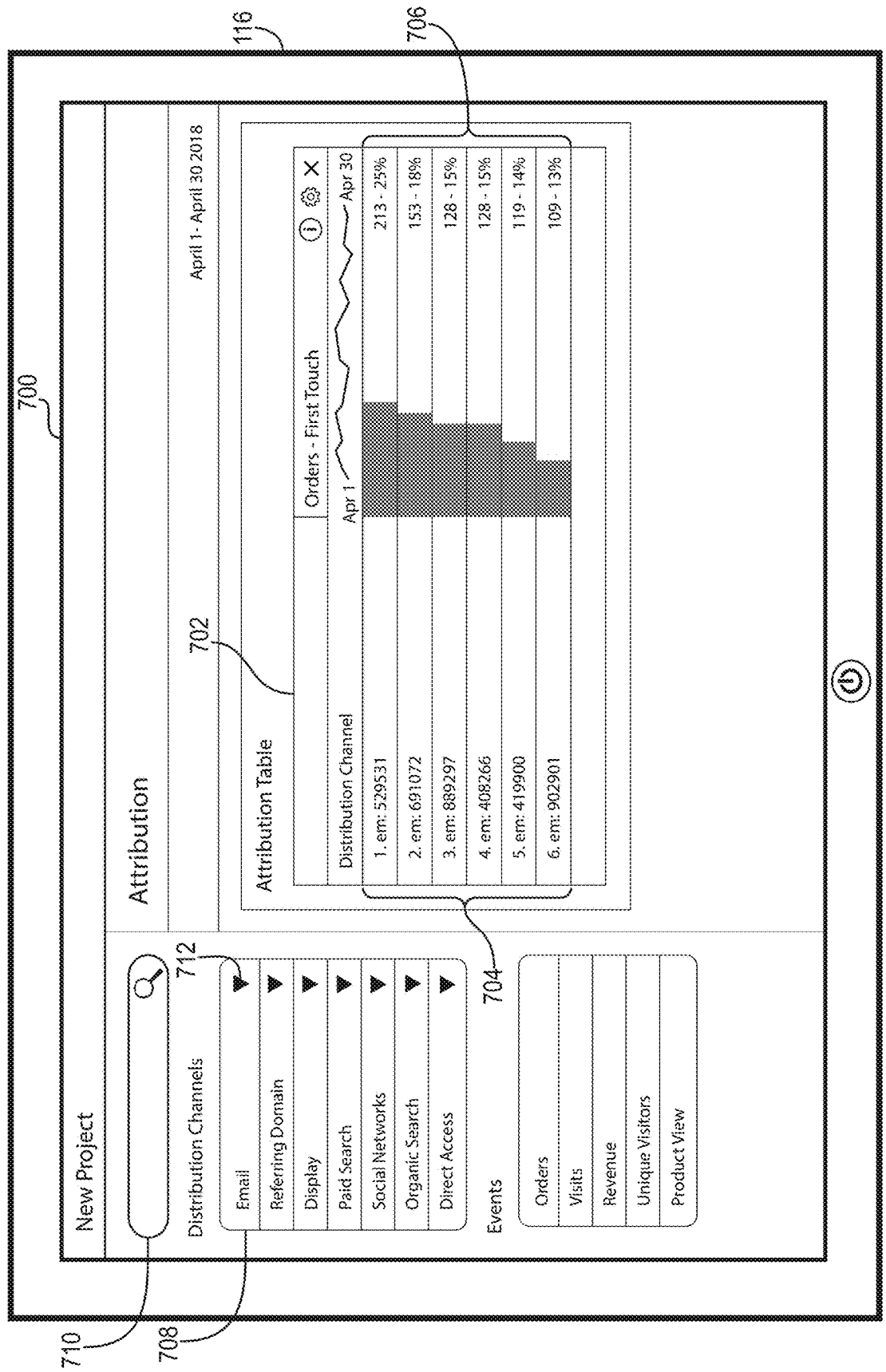
FIG. 7 illustrates a user interface displaying a digital attribution report for a plurality of sub-channel elements in accordance with one or more embodiments.

In one or more embodiments, the query-time attribution system 106 enables an administrator to submit a query to generate a digital attribution report for a plurality of sub-channel elements. In other words, the administrator can, at query-time, define the set of distribution channels as a set of sub-channel elements. FIG. 7 illustrates a user interface 700 provided by the query-time attribution system 106 for displaying a digital attribution report for sub-channel elements.

As shown in FIG. 7, the user interface 700 displays the digital attribution report 702, which includes (among other elements discussed above with reference to FIG. 3) a plurality of sub-channel elements 704 and an attribution display 706.

As shown in FIG. 7, the plurality of sub-channel elements 704 includes a plurality of individual emails corresponding to an email distribution channel. Though FIG. 7 illustrates individual emails as the plurality of sub-channel elements 704, the query-time attribution system 106 can generate digital attribution reports for sub-channel elements corresponding to any other distribution channel. Examples of sub-channel elements corresponding to other distribution channels include individual search terms or search phrases corresponding to a paid search channel or an organic search channel, individual hosting websites corresponding to a referring domain channel, individual banner advertisements corresponding to a display channel, individual social network pages or accounts corresponding to a social network channel, or individual web pages corresponding to a direct access channel.

In one or more embodiments, an administrator can access sub-channel elements to submit as part of a query by selecting a drop-down option presented with the corresponding distribution channel option. For example, in response to a user selecting the drop-down option 712 presented with the email channel option 708, the user interface 700 can present a list of individual emails that were distributed to recipient users. The administrator can then select one or more of the individual emails to submit as part of a query to generate a digital attribution report. In some embodiments, the user interface 700 presents sub-channel elements within a list in response to a search submitted by the administrator using the search bar 710.

Additionally, as shown in FIG. 7, the attribution display 706 shows the credit assigned to each sub-channel element for orders receives in the month of April according to the applied attribution model. For example, the attribution display 706 shows that, using a first touch model, the query-time attribution system 106 credited the email "em:529531" with 25% of the orders received in April and the email "em:691072" with 18% of the orders. Indeed, by generating digital attribution reports for sub-channel elements—therefore, by applying attribution models to subsets of touchpoint data corresponding to sub-channel elements—the query-time attribution system 106 performs a deeper analysis of distribution channels (i.e., on a per element basis). This enables an administrator to determine which sub-channel element performs best and, therefore, how to improve efforts with respect to the corresponding distribution channel.

Figure 8:
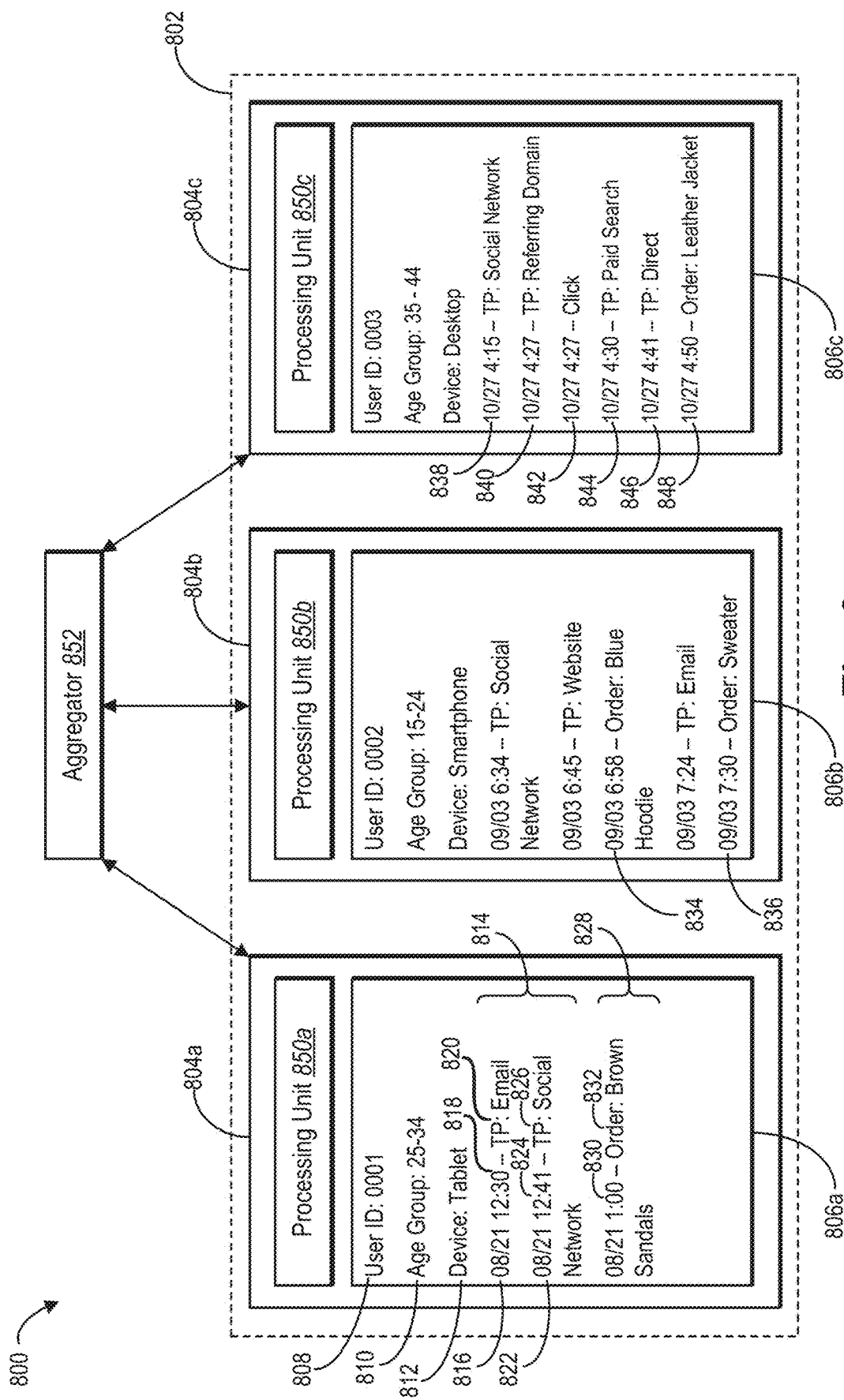
FIGS. 8-9 illustrate schematic representations of architecture of an attribution database in accordance with one or more embodiments.

As mentioned above, the query-time attribution system 106 stores touchpoint data in an attribution database in a manner to allow for fast and efficient query time attribution modeling. In response to an administrator submitting a query, the query-time attribution system 106 retrieves subsets of touchpoint data relevant to the query from the attribution database to generate the digital attribution report. The architecture of one or more embodiments of the attribution database and their use in storing and retrieving touchpoint data for the generation of digital attribution reports will now be discussed with reference to FIGS. 8-9 below. FIG. 8 illustrates an attribution database 800 used by the query-time attribution system 106 to store and retrieve touchpoint data in accordance with one or more embodiments. As can be seen in FIG. 8, the attribution database 800 includes a plurality of nodes 802 and an aggregator 852.

In particular, the plurality of nodes 802 includes a first node 804a, a second node 804b, and a third node 804c. For simplicity, FIG. 8 illustrates the plurality of nodes 802 including three nodes; however, it should be noted that the plurality of nodes 802 can include any number of nodes. As shown in FIG. 8, each of the nodes 804a-804c corresponds to a different user. Specifically, each of the nodes 804a-804c stores data associated with a corresponding user within a data storage unit (e.g., one of the data storage units 806a-806c). For example, the data storage unit of a node can store identification data, demographic data, device data, touchpoint data, and event data associated with the user corresponding to the node.

To provide an example, the first node 804a includes the data storage unit 806a for storing data associated with a first user. As shown in FIG. 8, the data storage unit 806a includes user ID 808, user demographics data 810, user device data 812, touchpoint data 814, and event data 828. The user ID 808 includes an identifier that identifies the first user. For example, FIG. 8 shows the user ID 808 including a numeric identifier assigned to the first user. However, the user ID 808 can include any other identifier appropriate for identifying a user, such as a name of the user or an IP address or cookie associated with the user's device.

The user demographics data 810 includes data characterizing the demographics of the first user. As shown in FIG. 8, the user demographics data 810 includes an age group of the first user. In one or more embodiments, the user demographics data 810 includes additional or alternative characterizing data. For example, the user demographics data 810 can include a user's gender, race, geographic location, occupation, employer, or level of education.

The user device data 812 includes data characterizing the device used by the first user. As shown in FIG. 8, the user device data 812 characterizes the device of the first user as a tablet. The user device data 812 can include other characterizing data as well (e.g., the brand of the device, the model of the device, the specs of the device, etc.).

The touchpoint data 814 includes instances of touchpoint data associated with the first user. As shown in FIG. 8, a first instance of touchpoint data 816 includes a first timestamp 818 and an associated first indication of a touchpoint 820. In particular, the first instance of touchpoint data 816 shows that the first user received an email at the time and date indicated by the first timestamp 818. Similarly, a second instance of touchpoint data 822 includes a second timestamp 824 and an associated second indication of a touchpoint 826, showing that the first user accessed a social network page at the time and date indicated by the second timestamp 824. In one or more embodiments, the instances of touchpoint data additionally include the sub-channel element corresponding to the touchpoint. For example, the first instance of touchpoint data 816 can include an identifier that identifies the particular email received by the first user.

In one or more embodiments, the first node 804a stores the instances of touchpoint data 816, 822 sequentially based on the timestamps. For example, by comparing the first timestamp 818 with the second timestamp 824, the first node 804a can determine that the first user received an email from the administrator before accessing a social network page. Consequently, the first node 804a stores the first instance of touchpoint data 816 in a manner that indicates that it chronologically precedes the second instance of touchpoint data 822. By storing the touchpoint data 814 chronologically, the query-time attribution system 106 can quickly determine, at query time, which data is relevant to a submitted query as will be discussed in more detail below.

As mentioned above, the first node 804a additionally stores the event data 828 within the data storage unit 806a. In particular, the event data 828 stored in the first node 804a includes one instance of event data that includes an event timestamp 830 and an indication of an event 832. The event timestamp 830 indicates when an event occurred and the indication of the event 832 provides detail regarding the event itself. For example, as shown in FIG. 8, the event data 828 indicates that the first user placed an order for brown sandals at the time and date indicated by the event timestamp 830. In one or more embodiments, the indication of the event 832 provides additional detail regarding the event (e.g., the dollar amount of the order). Though the event data 828 provides information regarding an order placed by the first user, in one or more embodiments, the first node 804a stores information regarding other events performed by the first user or resulting from actions of the first user (e.g., an application download, a click, a first-time visit, etc.).

In one or more embodiments, the first node 804a stores the event data 828 along with the touchpoint data 814 chronologically based on the event timestamp 830. For example, the event timestamp 830 indicates that the first user placed the order for the brown sandals after receiving the email from the administrator and after accessing the social network page associated with the administrator. Consequently, the first node 804a stores the event data 828 in a manner that indicates that it follows the first instance of touchpoint data 816 and the second instance of touchpoint data 822. By storing the event data 828 with the touchpoint data 814 chronologically, the first node 804a can quickly determine, at query time, how each instance of the touchpoint data 814 relates to the event as will be discussed in more detail below.

In one or more embodiments, each of the nodes 804a-804c can store multiple instances of events, whether those events are the same types of events or different types of events. In other words, each of the nodes 804a-804c stores all touchpoint data and event data associated with the user corresponding to the particular node. To provide an illustration, the second node 804b stores event data that includes multiple instances of event data within the data storage unit 806b. In particular, the second node 804b stores a first instance of event data 834 and a second instance of event data 836, where each of the instances of event data 834, 836 includes the same information as the event data 828 stored by the first node 804a. For example, as shown in FIG. 8, each of the instances of event data 834, 836 represents a different order placed by the second user and the date and time at which that order was placed. Thus, each of the nodes 804a-804c can store all data associated with a user within its respective data storage unit.

As shown in FIG. 8, each of the nodes 804a-804c further includes a processing unit (e.g., one of the processing units 850a-850c). In one or more embodiments, the processing unit of a node is used to store data in and retrieve data from that node. To provide an example, the third node 804c includes the processing unit 850c. The third node 804c can use the processing unit 850c to store data associated with the third user. For example, as the third node 804c receives touchpoint data and event data associated with the third user, the processing unit 850c can store the data in the data storage unit 806c chronologically based on the timestamp associated with each instance of the data. As shown in FIG. 8, the processing unit 850c stores a first instance of touchpoint data 838, a second instance of touchpoint data 840, a first instance of event data 842, a third instance of touchpoint data 844, a fourth instance of touchpoint data 846, and a second instance of event data 848 chronologically based on the associated timestamps.

Further, as mentioned, the third node 804c can use the processing unit 850c to retrieve data relevant to a query from the data storage unit 806c at query time. For example, the query-time attribution system 106 can submit instructions to the nodes of the attribution database 800 corresponding to a query that includes a user-specified set of distribution channels, a user-specified attribution model, and a user-specified event. In response to receiving the instructions, the third node 804c can use the processing unit 850c to retrieve a subset of touchpoint data corresponding to the user-specified set of distribution channels in accordance with the user-specified attribution model. In one or more embodiments, the processing unit 850c further retrieves the subset of touchpoint data based on the user-specified event. Specifically, the processing unit 850c filters out instances of touchpoint data that do not correspond to the user-specified set of distribution channels. The processing unit 850c then analyzes the remaining instances of touchpoint data in accordance with the user-specified attribution model and can further analyze the remaining instances of touchpoint data based on the user-specified event. Consequently, the processing unit 850c identifies one or more touchpoints called for by the user-specified attribution model.

To provide an illustration, the query-time attribution system 106 can receive a query that includes "social network" and "paid search" as the user-specified set of distribution channels, "first touch" as the user-specified attribution model, and "orders" as the user-specified event. The third node 804c can receive this request and use the processing unit 850c to retrieve relevant touchpoint data from the data storage unit 806c. In particular, the processing unit 850c filters the touchpoint data stored in the data storage unit 806c to exclude any touchpoint data that does not correspond to either the social network distribution channel or the paid search distribution channel (i.e., excludes the second instance of touchpoint data 840 and the fourth instance of touchpoint data 846.) The processing unit 850c then analyzes the remaining touchpoint data (i.e., the first instance of touchpoint data 838 and the third instance of touchpoint data 844) to identify the first touchpoint as called for by the first touch attribution model. In particular, because the query specified "orders" as the event, the processing unit 850c identifies the first touchpoint with respect to any orders indicated by either the first instance of event data 842 or the second instance of event data 848. Because only the second instance of event data 848 represents an order placed by the third user, the processing unit 850c retrieves a subset of touchpoint data that includes the social network touchpoint represented by the first instance of touchpoint data 838.

As another example, the query retrieved by the query-time attribution system 106 can include "last touch" as the user-specified attribution model instead of "first touch." In response, the processing unit 850c analyzes the first instance of touchpoint data 838 and the third instance of touchpoint data 844 (i.e., the touchpoint data remaining after the filtering) to identify the last touchpoint that occurred before the third user placed the order. Because the processing unit 850c filtered out the fourth instance of touchpoint data 846 (i.e., the objective last touchpoint before the third user placed the order), the processing unit 850c retrieves a subset of touchpoint data that includes the paid search touchpoint represented by the third instance of touchpoint data 846. In other words, in one or more embodiments, when a processing unit filters out instances of touchpoint data that do not correspond to the user-specified set of distribution channels included in a query, another touchpoint may take the place of the excluded touchpoint to represent the touchpoint called for by the user-specified attribution model. In some embodiments, the processing unit merely does not return a touchpoint called for by the attribution model (e.g., the processing unit 850c does not retrieve a last touchpoint).

In one or more embodiments, the processing units can further combine instances of touchpoint data retrieved from their respective nodes. In particular, the processing units can combine instances of touchpoint data that are of the same type. For example, if the processing unit 850c retrieved a subset of touchpoint data that includes two paid search touchpoints and one email touchpoint—each representing the first touch point for a different event—the processing unit could combine the two paid search touchpoints. Consequently, the aggregator 852 is able to combine subsets of touchpoint data that has already been consolidated by each respective node. In other words, the query-time attribution system 106 uses the database 800 to perform a two-step process for combining touchpoint data—a first step performed by the plurality of nodes 802 and a second step performed by the aggregator 852 discussed as follows.

As mentioned above, the attribution database 800 further includes the aggregator 852. In one or more embodiments, the query-time attribution system 106, after receiving a query, uses the aggregator 852 to instruct the plurality of nodes 802 to retrieve subsets of touchpoint data relevant to the query. In some embodiments, the aggregator 852 generates instructions based on the query and passes the instructions to the plurality of nodes 802. In some embodiments, the aggregator merely forwards the query onto the plurality of nodes 802.

Additionally, the query-time attribution system 106 uses the aggregator 852 to combine the subsets of touchpoint data retrieved from the plurality of nodes 802. In particular, the aggregator 852 combines touchpoints from the subsets of touchpoint data that correspond to the same distribution channel. For example, as shown in FIG. 8, in response to receiving a query that specifies a first touch attribution model and excludes email, the aggregator 852 can receive three subsets of touchpoint data that include a social network touchpoint from the plurality of nodes 802. Subsequently, the aggregator 852 combines the subsets of touchpoint data to attribute three orders to the social network distribution channel (assuming the query included orders as the user-specified event). In one or more embodiments, the aggregator further combines the dollar amounts associated with each order. After the aggregator 852 combines the subsets of touchpoint data received from the plurality of nodes 802, the query-time attribution system 106 can use the combined subsets of touchpoint data to generate a digital attribution report.

Figure 9:
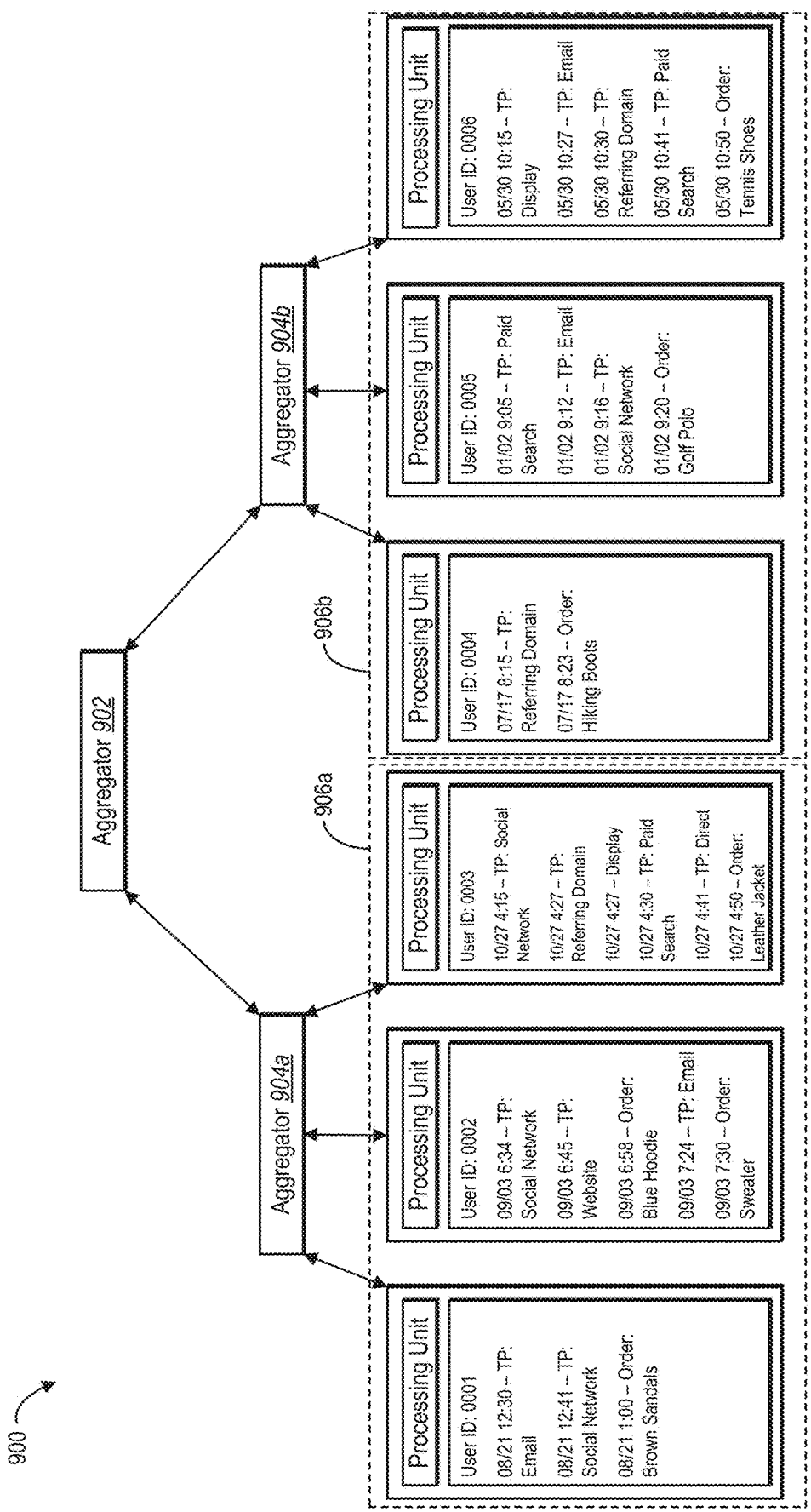

In one or more embodiments, the attribution database further includes a plurality of intermediate aggregators. FIG. 9 illustrates an attribution database 900 that includes a plurality of intermediate aggregators in accordance with one or more embodiments. In particular, the attribution database 900 includes a master aggregator 902, a first intermediate aggregator 904a, a second intermediate aggregator 904b, a first subset of nodes 906a, and a second subset of nodes 906b. As seen in FIG. 9, the first subset of nodes 906a corresponds to the first intermediate aggregator 904a and the second subset of nodes 906b corresponds to the second intermediate aggregator 904b. In one or more embodiments, the attribution database 900 includes any number of intermediate aggregators and associated subsets of nodes.

In one or more embodiments, the combination of intermediate aggregator and the corresponding subset of nodes operates similar to attribution database 800 of FIG. 8. For example, the first subset of nodes 906*a* uses the user-specified attribution model included in a query to identify first subsets of touchpoint data corresponding to the user-specified set of distribution channels. The first intermediate aggregator 904*a* then combines data from the first subsets of touchpoint data to generate a first set of aggregated touchpoint data. Similarly, the second subset of nodes 906*b* uses the user-specified attribution model to identify second subsets of touchpoint data corresponding to the user-specified set of distribution channels and the second intermediate aggregator 904*b* combines data from the second subsets to generate a second set of aggregated touchpoint data.

The master aggregator 902 combines data from the intermediate aggregators 904*a*, 904*b*. For example, as shown in FIG. 9, the master aggregator can combine the first set of aggregated touchpoint data received from the first intermediate aggregator 904*a* and the second set of aggregated touchpoint data received from the second intermediate aggregator 904*b*. The query-time attribution system 106 can then use the combined sets of aggregated touchpoint data to generate a digital attribution report.

As shown above, the structure of the backend (e.g., attribution database 800) of the query-time attribution system 106 allows for on demand, query-time attribution modeling with in a fast and efficient manner. The structure of the backend (e.g., attribution database 800) of the query-time attribution system 106 allows for fast and efficient query-time attribution modeling. In particular, by storing touchpoint data for a single user in each node, the query-time attribution system eliminates the need for node cross-talk and ensures that each node can essentially instantaneously (e.g., in milliseconds) retrieve and forward to an aggregator the data applicable to an attribution query. The aggregator can then combine the applicable data so as to build an attribution report. Thus, despite having to processes large numbers of data, the structure of the query-time attribution system allows for fast and flexible query-time attribution modeling.

Thus, the query-time attribution system 106 stores touchpoint data in an attribution database. Additionally, the query-time attribution system 106 can use the touchpoint data, as stored in the attribution database, to generate digital attribution reports in real time in response to receiving a query. The algorithms and acts described in reference to FIGS. 8-9 can comprise the corresponding structure for performing a step for storing touchpoint data in an attribution database in a manner that supports query-time attribution channel modeling. Additionally, the attribution database architecture described in relation to FIGS. 8-9 can comprise the corresponding structure for performing a step for storing touchpoint data in an attribution database in a manner that supports query-time attribution channel modeling.

Further, the query-time attribution system 106 retrieves and combines touchpoint data in in response to receiving a query. Additionally, the query-time attribution system 106 can use the combined data to generate a digital attribution report in response to a query in real time and provide the report to a client device via a user interface. The algorithms and acts described with reference to FIGS. 3-9 can comprise the corresponding structure for performing, in real time in response to the query, a step for generating the digital attribution report for the user-specified set of distribution channels using the user-specified attribution model based on the touchpoint data stored in the attribution database. Additionally, the attribution database architecture described in relation to FIGS. 3-9 can comprise the corresponding structure for performing, in real time in response to the query, a step for generating the digital attribution report for the user-specified set of distribution channels using the user-specified attribution model based on the touchpoint data stored in the attribution database.

Figure 10:
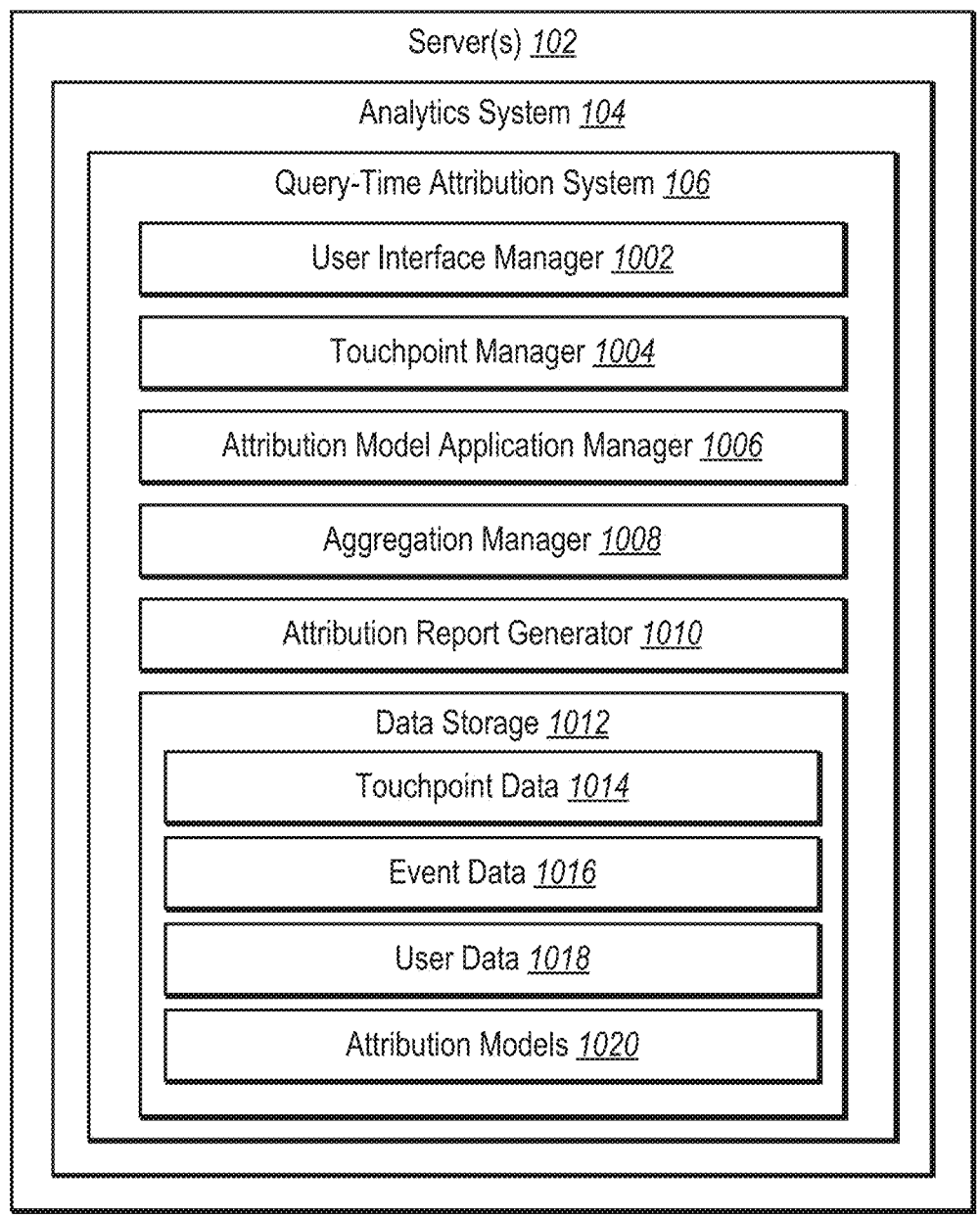
FIG. 10 illustrates an example schematic diagram of a query-time attribution system in accordance with one or more embodiments.

FIG. 10 illustrates a detailed schematic diagram of an example architecture of the query-time attribution system 106. As shown, the query-time attribution system 106 can be part of the server(s) 102 and the analytics system 104. Additionally, the query-time attribution system 106 can include, but is not limited to, a user interface manager 1002, a touchpoint manager 1004, an attribution model application manager 1006, an aggregation manager 1008, an attribution report generator 1010, and data storage 1012 (which includes touchpoint data 1014, event data 1016, user data 1018, and attribution models 1020).

As just mentioned, and as illustrated in FIG. 10, the query-time attribution system 106 includes the user interface manager 1002. In particular, the user interface manager 1002 provides, to a client device associated with an administrator, a user interface through which the administrator can submit a query for a digital attribution report. For example, the user interface manager 1002 can provide options for selecting a set of distribution channels, an event, and/or an attribution model. Additionally, the user interface manager 1002 provides, through the user interface, one or more digital attribution reports generated by the attribution report generator 1010 in response to the query.

As shown in FIG. 10, the query-time attribution system 106 also includes the touchpoint manager 1004. In particular, the touchpoint manager 1004 can track touchpoints associated with a given user and store the corresponding touchpoint data in touchpoint data 1014. For example, the touchpoint manager 1004 can communicate with a third-party network server (e.g., the third-party network server 122) to determine when a touchpoint has occurred (e.g., when an email has been received or when a search has been performed).

Additionally, as shown in FIG. 10, the query-time attribution system 106 includes the attribution model application manager 1006. In particular, each node of the attribution database includes an instance of the attribution model application manager 1006 (e.g., stored in the processing unit). The attribution model application manager 1006 retrieves data relevant to a query received through the user interface manager 1002. For example, the attribution model application manager 1006 of a given node can retrieve a subset of touchpoint data corresponding to a user-specified set of distribution channels in accordance with a user-specified attribution model and based on a user-specified event. The attribution model application manager 1006 further combines multiple instances of touchpoint data, when applicable.

Further, as shown in FIG. 10, the query-time attribution system 106 includes the aggregation manager 1008. In particular, the aggregator (or each intermediate aggregator) of the attribution database includes an instance of the aggregation manager 1008. The aggregation manager 1008 combines subsets of touchpoint data received from the instances of the attribution model application manager 1006 (or combines sets of aggregated touchpoint data received from instances of the aggregation manager 1008 corresponding to intermediate aggregators).

Additionally, as shown in FIG. 10, the query-time attribution system 106 includes the attribution report generator

1010. In particular, the attribution report generator 1010 generates digital attribution reports using subsets of touchpoint data combined by the aggregation manager 1008. The attribution report generator 1010 can then send the digital attribution reports to the user interface manager 1002 for display through a user interface.

Further, as shown in FIG. 10, the query-time attribution system 106 includes data storage 1012. In particular, data storage 1012 includes touchpoint data 1014, event data 1016, user data 1018, and attribution models 1020. Each node of the attribution database includes an instance of touchpoint data 1014, event data 1016, and user data 1018. Touchpoint data 1014 stores instances of touchpoint data associated with a particular user. An instance of the attribution model application manager 1006 retrieves instances of touchpoint data from a corresponding instance of touchpoint data 1014. Event data 1016 stores instances of event data and user data 1018 stores data describing a user or the user's device (e.g., user ID, demographic information, device information, etc.). Attribution models 1020 stores the attribution models the query-time attribution system 106 can apply. For example, attribution models 1020 can store instructions, that get passed to the attribution model application manager 1006, on how to apply the particular attribution model after an administrator has submitted a query.

Each of the components 1002-1020 of the query-time attribution system 106 can include software, hardware, or both. For example, the components 1002-1020 can include one or more instructions stored on a computer-readable storage medium and executable by processors of one or more computing devices, such as a client device or server device. When executed by the one or more processors, the computer-executable instructions of the query-time attribution system 106 can cause the computing device(s) to perform the methods described herein. Alternatively, the components 1002-1020 can include hardware, such as a special-purpose processing device to perform a certain function or group of functions. Additionally, or alternatively, the components 1002-1020 of the query-time attribution system 106 can include a combination of computer-executable instructions and hardware.

Furthermore, the components 1002-1020 of the query-time attribution system may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1002-1020 of the query-time attribution system 106 may be implemented as a stand-alone application, such as a desktop or mobile application. Furthermore, the components 1002-1020 of the query-time attribution system 106 may be implemented as one or more web-based applications hosted on a remote server. Alternatively, or additionally, the components 1002-1020 of the query-time attribution system 106 may be implemented in a suite of mobile device applications or "apps." For example, in one or more embodiments, the query-time attribution system can comprise or operate in connection with digital software applications such as ADOBE® ANALYTICS CLOUD® or ADOBE® MARKETING CLOUD®. "ADOBE," "ANALYTICS CLOUD," and "MARKETING CLOUD" are either registered trademarks or trademarks of Adobe Inc. in the United States and/or other countries. FIGS. 1-10, the corresponding text, and the examples provide a number of different methods, systems, devices, and non-transitory computer-readable media of the query-time attribution system 106.

Figure 11:
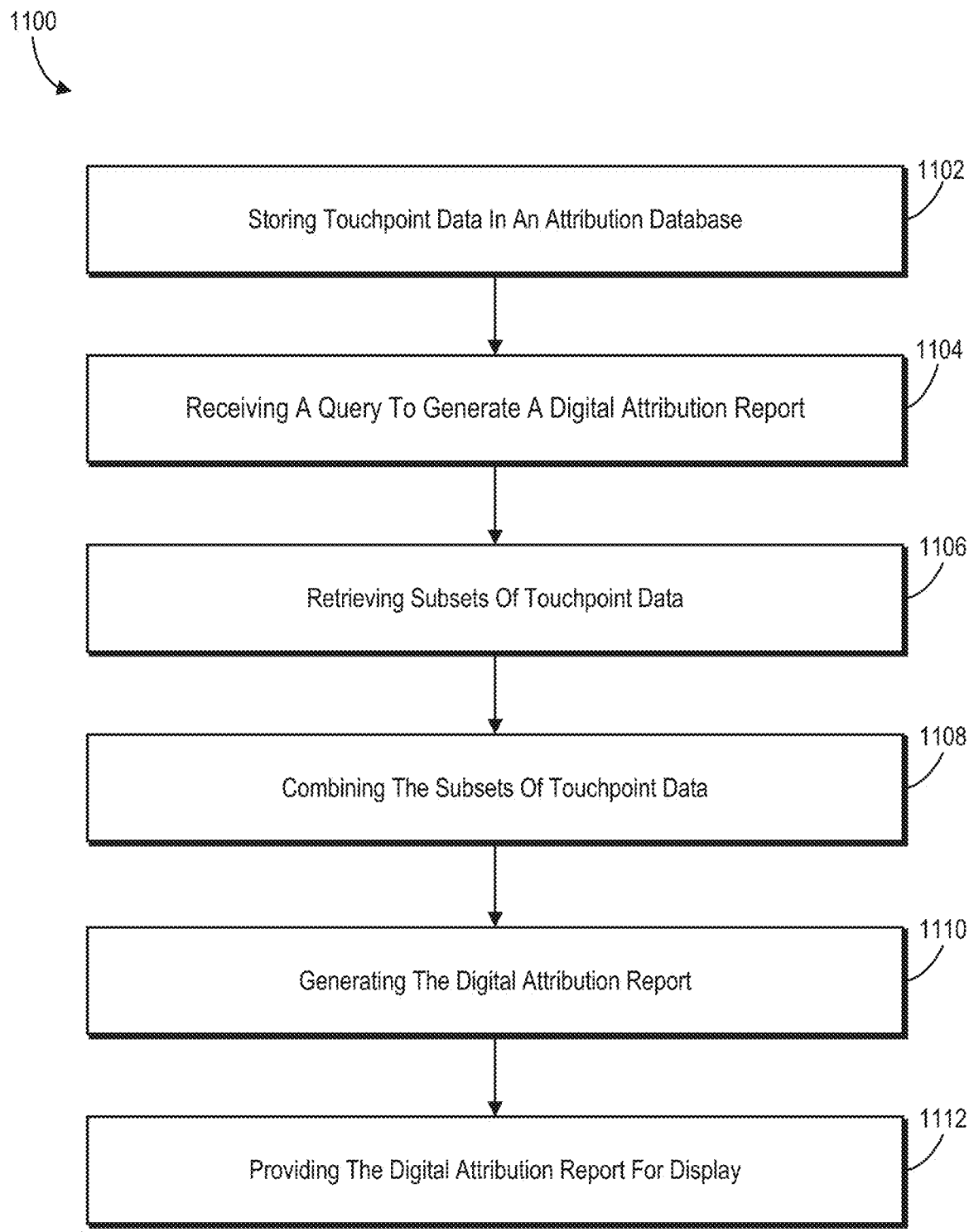
FIG. 11 illustrates a flowchart of a series of acts of generating digital attribution reports in real time in response to receiving a query in accordance with one or more embodiments.

In addition to the foregoing, one or more embodiments can also be described in terms of flowcharts comprising acts for accomplishing a particular result, as shown in FIG. 11. FIG. 11 may be performed with more or fewer acts. Further, the acts may be performed in differing orders. Additionally, the acts described herein may be repeated or performed in parallel with one another or parallel with different instances of the same or similar acts.

As mentioned, FIG. 11 illustrates a flowchart of a series of acts 1100 for generating a digital attribution report in response to receiving a query in accordance with one or more embodiments. While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer-readable medium can comprise instructions that, when executed by one or more processors, cause a computing device to perform the acts of FIG. 11. In some embodiments, a system can perform the acts of FIG. 11.

The series of acts 1100 includes an act 1102 of storing touchpoint data in an attribution database. For example, the act 1102 involves storing touchpoint data in an attribution database comprising an aggregator and a plurality of nodes, wherein each node corresponds to a given user and stores touchpoint data associated with the given user. In one or more embodiments, the touchpoint data comprises one or more touchpoints and a timestamp associated with each of the one or more touchpoints. Specifically, in some embodiments, an instance of touchpoint data comprises an indication of a touchpoint and a timestamp associated with the touchpoint. Consequently, in some embodiments, storing the touchpoint data in the attribution database comprises storing, in each node, instances of touchpoint data sequentially based on the timestamp associated with each touchpoint of a corresponding user.

In one or more embodiments, the attribution database further comprises a plurality of intermediate aggregators, wherein each intermediate aggregator is associated with, and aggregates data from, a subset of the nodes of the plurality of nodes. For example, the attribution database can comprise a first intermediate aggregator corresponding to a first subset of nodes and a second intermediate aggregator corresponding to a second subset of nodes.

The series of acts 1100 also includes an act 1104 of receiving a query to generate a digital attribution report. For example, the act 1104 involves receiving a query to generate a digital attribution report for a user-specified set of distribution channels based on a user-specified attribution model. In one or more embodiments, receiving the query to generate the digital attribution report comprises receiving a request to generate the digital attribution report for a plurality of sub-channel elements. In some embodiments, the user-specified set of distribution channels comprises at least one of a paid search channel, an organic search channel, a referring domain channel, a display channel, a social network channel, an email channel, or a direct access channel. In some embodiments, the user-specified attribution model comprises a custom attribution model comprising a user-specified set of weights to be applied to the subsets of touchpoint data corresponding to the user-specified set of distribution channels. In further embodiments, the user-specified attribution model comprises a time decay attribution model comprising a user-specified half-life to be applied to the subsets of touchpoint data corresponding to the user-specified set of distribution channels.

The series of acts 1100 further includes an act 1106 of retrieving subsets of touchpoint data. For example, the act 1106 involves, in response to receiving the query and in real time, retrieving, using the nodes of the plurality of nodes, subsets of touchpoint data corresponding to the user-specified set of distribution channels in accordance with the user-specified attribution model. In one or more embodiments, retrieving the subsets of touchpoint data comprises filtering, at each node, a subset of touchpoints for the associated user that correspond to the user-specified set of distribution channels in accordance with the user-specified attribution model.

In some embodiments, retrieving the subsets of touchpoint data comprises sending, to the plurality of nodes, a request for touchpoint data corresponding to the user-specified set of distribution channels based on the user-specified attribution model and using the user-specified attribution model, at the plurality of nodes, to identify subsets of touchpoint data corresponding to the user-specified set of distribution channels to send to the aggregator. In one or more embodiments, using the user-specified attribution model, at the plurality of nodes, to identify subsets of touchpoint data comprises filtering, at each node, a subset of touchpoints for the associated user that correspond to the user-specified set of distribution channels in accordance with the user-specified attribution model. In some embodiments, filtering, at each node, the subset of touchpoints comprises filtering, at each node, to exclude instances of touchpoint data that do not correspond to the user-specified set of distribution channels and analyzing instances of touchpoint data remaining after the filtering in accordance with the user-specified attribution channel. In further embodiments, analyzing the instances of touchpoint data remaining after the filtering comprises identifying one or more touchpoints called for by the user-specified attribution model.

Where the attribution database further comprises a plurality of intermediate aggregators, using the user-specified attribution model, at the plurality of nodes, to identify subsets of touchpoint data comprises using the user-specified attribution model, at the first subset of nodes, to identify a first subsets of touchpoint data corresponding to the user-specified set of distribution channels and using the user-specified attribution model, at the second subset of nodes, to identify a second subsets of touchpoint data corresponding to the user-specified set of distribution channels.

Additionally, the series of acts 1100 includes an act 1108 of combining the subsets of touchpoint data. For example, the act 1108 involves, in response to receiving the query and in real time, combining, using the aggregator, the subsets of touchpoint data corresponding to the user-specified set of distribution channels in accordance with the user-specified attribution model.

Where the attribution database further comprises a plurality of intermediate aggregators, the series of acts 1100 can further include an act for aggregating, using each intermediate aggregator, the subsets of touchpoint data from the subset of nodes corresponding to each intermediate aggregator to generate sets of aggregated touchpoint data (not shown). Consequently, combining, using the aggregator, the subsets of touchpoint data comprises combining the sets of aggregated touchpoint data from the plurality of intermediate aggregators. To illustrate, where the attribution database further comprises a first and second intermediate aggregator, the series of acts 1100 further includes aggregating, using the first intermediate aggregator, data from the first subsets of touchpoint data corresponding to the user-specified set of distribution channels to generate a first set of aggregated touchpoint data; and aggregating, using the second intermediate aggregator, data from the second subsets of touchpoint data corresponding to the user-specified distribution channels to generate a second set of aggregated touchpoint data. Consequently, combining, at the aggregator, the subsets of touchpoint data corresponding to the user-specified set of distribution channels from the plurality of nodes comprises combining the first set of aggregated touchpoint data and the second set of aggregated touchpoint data.

Further, the series of acts 1100 includes an act 1110 of generating the digital attribution report. For example, the act 1110 involves, in response to receiving the query and in real time, generating the digital attribution report using the combined subsets of touchpoint data (or the combined sets of aggregated touchpoint data).

The series of acts 1100 also includes an act 1112 of providing the digital attribution report for display. For example, the act 1112 involves, in response to receiving the query and in real time, providing the digital attribution report for display (i.e., display on a user interface of an administrator device).

In one or more embodiments, the series of acts 1100 further includes acts for generating a second digital attribution report in response to receiving a second query. For example, in one or more embodiments, the query-time attribution system 106 receives a second query to generate a second digital attribution report for the user-specified set of distribution channels based on a second user-specified attribution model. In response to receiving the second query, and in real time, the query-time attribution system 106 can retrieve, using the nodes of the plurality of nodes, second subsets of touchpoint data corresponding to the user-specified set of distribution channels in accordance with the second user-specified attribution model; combine, using the aggregator, the second subsets of touchpoint data corresponding to the user-specified set of distribution channels in accordance with the second user-specified attribution model; and generate the second digital attribution report using the combined second subsets of touchpoint data. Subsequently, the query-time attribution system 106 can provide the second digital attribution report for display simultaneously with the (first) digital attribution report.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
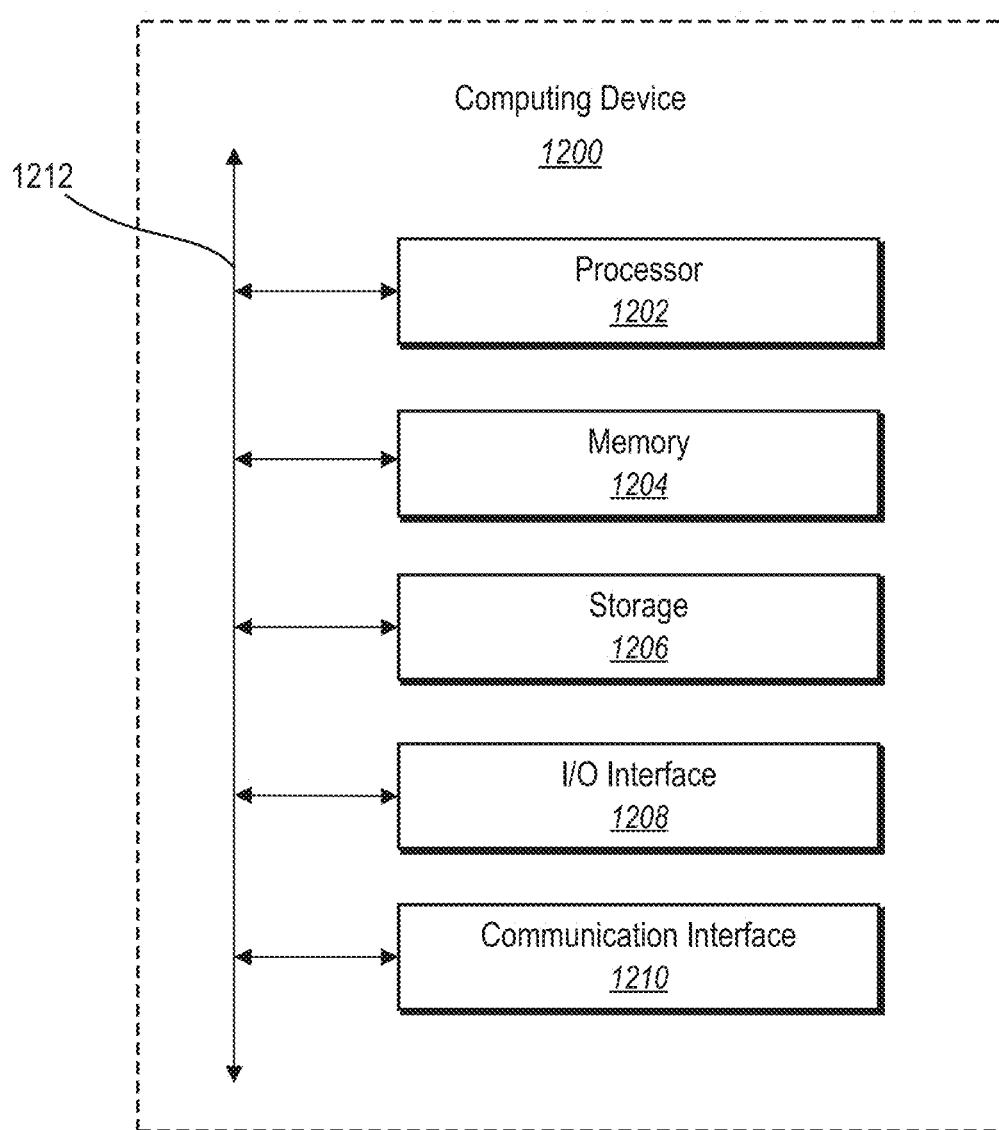
FIG. 12 illustrates a block diagram of an exemplary computing device in accordance with one or more embodiments.

FIG. 12 illustrates a block diagram of an example computing device 1200 that may be configured to perform one or more of the processes described above. One will appreciate that one or more computing devices, such as the computing device 1200 may represent the computing devices described above (e.g., the server(s) 102, client devices 110*a*-110*n*, and the administrator device 116). In one or more embodiments, the computing device 1200 may be a mobile device (e.g., a mobile telephone, a smartphone, a PDA, a tablet, a laptop, a camera, a tracker, a watch, a wearable device, etc.). In some embodiments, the computing device 1200 may be a non-mobile device (e.g., a desktop computer or another type of client device). Further, the computing device 1200 may be a server device that includes cloud-based processing and storage capabilities.

As shown in FIG. 12, the computing device 1200 can include one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, the storage device 1206 can include a non-transitory storage medium described above. The storage device 1206 may include a hard disk drive (HDD), flash memory, a Universal Serial Bus (USB) drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can include hardware, software, or both that connects components of computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital medium environment for collecting and analyzing analytics data about network communications, a method for generating digital attribution reports in real-time comprising:
   performing a step for storing touchpoint data in an attribution database in a manner that supports query-time attribution channel modeling;
   receiving a query to generate a digital attribution report, the query indicating a user-specified set of distribution channels and a user-specified attribution model; and
   performing, in real time in response to the query, a step for generating the digital attribution report for the user-specified set of distribution channels using the user-specified attribution model based on the touchpoint data stored in the attribution database.

2. The method of claim 1, wherein receiving the query to generate the digital attribution report comprises receiving a request to generate the digital attribution report for a plurality of sub-channel elements.

3. The method of claim 1, wherein the touchpoint data comprises one or more touchpoints and a timestamp associated with each of the one or more touchpoints.

4. The method of claim 1, wherein the user-specified set of distribution channels comprises at least one of:
   a paid search channel;
   an organic search channel;
   a referring domain channel;
   a display channel;
   a social network channel;
   an email channel; or
   a direct access channel.

5. A non-transitory computer readable storage medium comprising instructions that, when executed by at least one processor, cause a computing device to:
   store touchpoint data in an attribution database comprising an aggregator and a plurality of nodes, wherein each node corresponds to a given user and comprises a processing unit that receives and stores touchpoint data associated with the given user;
   receive a query to generate a digital attribution report, the query indicating a user-specified set of distribution channels and a user-specified attribution model; and
   after receiving the query and in real time:
      retrieve, from nodes of the plurality of nodes, subsets of touchpoint data by utilizing the processing unit of a given node of the nodes to retrieve a subset of touchpoint data associated with a user corresponding to the given node based on the user-specified set of distribution channels and the user-specified attribution model;
      combine, using the aggregator, the subsets of touchpoint data corresponding to the user-specified set of distribution channels in accordance with the user-specified attribution model;

generate the digital attribution report using the combined subsets of touchpoint data; and
provide the digital attribution report for display.

6. The non-transitory computer readable storage medium of claim 5, wherein:
an instance of touchpoint data comprises an indication of a touchpoint and a timestamp associated with the touchpoint, and
the instructions, when executed by the at least one processor, cause the computing device to store the touchpoint data in the attribution database by storing, in each node, instances of touchpoint data chronologically based on the timestamp associated with each touchpoint of a corresponding user.

7. The non-transitory computer readable storage medium of claim 5, wherein the instructions, when executed by the at least one processor, cause the computing device to, retrieve, from the nodes of the plurality of nodes, the subsets of touchpoint data by utilizing the processing unit of the given node of the nodes to retrieve the subset of touchpoint data associated with the user corresponding to the given node based on the user-specified set of distribution channels and the user-specified attribution model by utilizing the processing unit of the given node to filter a subset of touchpoints that correspond to the user-specified set of distribution channels in accordance with the user-specified attribution model.

8. The non-transitory computer readable storage medium of claim 5, wherein the attribution database further comprises a plurality of intermediate aggregators, wherein each intermediate aggregator is associated with, and aggregates data from, a different subset of the nodes of the plurality of nodes.

9. The non-transitory computer readable storage medium of claim 8,
further comprising instructions that, when executed by the at least one processor, cause the computing device to aggregate, using each intermediate aggregator, the subsets of touchpoint data from the subset of the nodes corresponding to each intermediate aggregator to generate sets of aggregated touchpoint data,
wherein the instructions, when executed by the at least one processor, cause the computing device to combine, using the aggregator, the subsets of touchpoint data by combining the sets of aggregated touchpoint data from the plurality of intermediate aggregators.

10. The non-transitory computer readable storage medium of claim 5, further comprising instructions that, when executed by the at least one processor, cause the computing device to:
receive a second query to generate a second digital attribution report second query indicating the user-specified set of distribution channels and a second user-specified attribution model;
after receiving the second query and in real time:
retrieve from the nodes of the plurality of nodes, second subsets of touchpoint data by utilizing the processing unit of the given node of the nodes to retrieve a second subset of touchpoint data associated with the user corresponding to the given node based on the user-specified set of distribution channels and the second user-specified attribution model;
combine, using the aggregator, the second subsets of touchpoint data corresponding to the user-specified set of distribution channels in accordance with the second user-specified attribution model; and generate the second digital attribution report using the combined second subsets of touchpoint data; and
provide the second digital attribution report for display simultaneously with the digital attribution report.

11. The non-transitory computer readable storage medium of claim 5, wherein the user-specified attribution model comprises a custom attribution model comprising a user-specified set of weights to be applied to the subsets of touchpoint data corresponding to the user-specified set of distribution channels.

12. The non-transitory computer readable storage medium of claim 5, wherein the user-specified attribution model comprises a time decay attribution model comprising a user-specified half-life to be applied to the subsets of touchpoint data corresponding to the user-specified set of distribution channels.

13. A system comprising:
a memory component comprising:
an aggregator; and
a plurality of nodes, wherein each node corresponds to a given user and comprises a processing unit that is configured to receive and sequentially store touchpoint data associated with the given user;
at least one server; and
at least one non-transitory computer readable storage medium comprising instructions that, when executed by the at least one server, cause the system to:
receive a query to generate a digital attribution report the query indicating a user-specified set of distribution channels and a user-specified attribution model; and
after receiving the query and in real time:
send, to the plurality of nodes, a request for touchpoint data corresponding to the user-specified set of distribution channels based on the user-specified attribution model;
retrieve, from nodes of the plurality of nodes, subsets of touchpoint data to send to the aggregator by utilizing the processing unit of a given node to identify a subset of touchpoint data associated with a user corresponding to the given node based on the user-specified set of distribution channels and the user-specified attribution model;
combine, at the aggregator, the subsets of touchpoint data corresponding to the user-specified set of distribution channels from the plurality of nodes;
generate the digital attribution report based on the combined subsets of touchpoint data; and
provide the digital attribution report for display on a client device.

14. The system of claim 13,
wherein an instance of touchpoint data comprises an indication of a touchpoint and a timestamp associated with the touchpoint, and
further comprising instructions that, when executed by the at least one server, cause the system to store, in each node, instances of touchpoint data sequentially based on the timestamp associated with each touchpoint of a corresponding user.

15. The system of claim 13, wherein the instructions, when executed by the at least one server, cause the system to retrieve, from the nodes of the plurality of nodes, the subsets of touchpoint data to send to the aggregator by utilizing the processing unit of the given node to identify the subset of touchpoint data associated with the user corresponding to the give node based on the user-specified set of distribution channels and the user-specified attribution model by utilizing the processing unit of the given node to filter a subset of touchpoints that correspond to the user-specified set of distribution channels in accordance with the user-specified attribution model.

16. The system of claim 15, wherein utilizing the processing unit of the given node to filter the subset of touchpoints that correspond to the user-specified set of distribution channels in accordance with the user-specified attribution model comprises:

filtering utilizing the processing unit of the given node, to exclude one or more instances of touchpoint data that do not correspond to the user-specified set of distribution channels; and analyzing one or more instances of touchpoint data remaining after the filtering in accordance with the user-specified attribution model.

17. The system of claim 16, wherein analyzing the one or more instances of touchpoint data remaining after the filtering in accordance with the user-specified attribution model comprises identifying one or more touchpoints called for by the user-specified attribution model.

18. The system of claim 13, wherein:

the memory component further comprises:
    a first intermediate aggregator corresponding to a first subset of nodes; and
    a second intermediate aggregator corresponding to a second subset of nodes, and the instructions, when executed by the at least one server, cause the system to retrieve, from the nodes of the plurality of nodes, the subsets of touchpoint data to send to the aggregator by utilizing the processing unit of the given node to identify the subset of touchpoint data associated with the user corresponding to the given node based on the user-specified set of distribution channels and the user-specified attribution model by:
    using the user-specified attribution model, at the first subset of nodes, to identify a first subsets of touchpoint data corresponding to the user-specified set of distribution channels; and
    using the user-specified attribution model, at the second subset of nodes, to identify a second subsets of touchpoint data corresponding to the user-specified set of distribution channels.

19. The system of claim 18, further comprising instructions that, when executed by the at least one server, cause the system to:
    aggregate, using the first intermediate aggregator, data from the first subsets of touchpoint data corresponding to the user-specified set of distribution channels to generate a first set of aggregated touchpoint data; and
    aggregate, using the second intermediate aggregator, data from the second subsets of touchpoint data corresponding to the user-specified set of distribution channels to generate a second set of aggregated touchpoint data,
wherein the instructions, when executed by the at least one server, cause the system to combine, at the aggregator, the subsets of touchpoint data corresponding to the user-specified set of distribution channels from the plurality of nodes by combining the first set of aggregated touchpoint data and the second set of aggregated touchpoint data.

20. The non-transitory computer readable storage medium of claim 5, wherein the instructions, when executed by the at least one processor, cause the computing device to:

receive the query to generate the digital attribution report by receiving the query indicating the user-specified set of distribution channels, the user-specified attribution model, and a user-specified event; and retrieve, from the nodes of the plurality of nodes, the subsets of touchpoint data by utilizing the processing unit of the given node of the nodes to retrieve the subset of touchpoint data associated with the user corresponding to the given node based on the user-specified set of distribution channels and the user-specified attribution model by utilizing the processing unit of the given node to retrieve the subset of touchpoint data based on the user-specified set of distribution channels, the user-specified attribution model, and the user-specified event.

* * * * *